United States Patent
Ketchell, III et al.

(10) Patent No.: US 11,792,196 B2
(45) Date of Patent: Oct. 17, 2023

(54) RESTRICTING SCREENSHARE OF WEB PAGES TO SELECT LIST OF ALLOWED WEBSITE URLS

(71) Applicant: Glance Networks, Inc., Wakefield, MA (US)

(72) Inventors: Robert D. Ketchell, III, Hampton Falls, NH (US); Deborah Mendez, Arlington, MA (US); Kyle Shank, Newburyport, MA (US); Brendan Ronan, Watertown, MA (US); Carlos Smith, Medford, MA (US); Andrew Norman, Bumpass, VA (US); Edward J. McGowan, Winchester, MA (US)

(73) Assignee: Glance Networks, Inc., Wakefield, MA (US)

( * ) Notice: Subject to any disclaimer, the term of this patent is extended or adjusted under 35 U.S.C. 154(b) by 0 days.

(21) Appl. No.: 18/110,495

(22) Filed: Feb. 16, 2023

(65) Prior Publication Data
US 2023/0262064 A1    Aug. 17, 2023

Related U.S. Application Data

(60) Provisional application No. 63/310,728, filed on Feb. 16, 2022.

(51) Int. Cl.
*H04L 9/40*      (2022.01)
*G06V 30/16*   (2022.01)
*G06V 30/19*   (2022.01)

(52) U.S. Cl.
CPC ............ *H04L 63/101* (2013.01); *G06V 30/16* (2022.01); *G06V 30/19013* (2022.01)

(58) Field of Classification Search
CPC ....... H04L 63/10; H04L 63/101; G06V 30/16; G06V 30/19013
See application file for complete search history.

(56) References Cited

U.S. PATENT DOCUMENTS 7,222,306 B2 *  5/2007  Kaasila ................. G06F 3/0488
                                                                    715/800
8,863,008 B2  10/2014  Chan et al.
(Continued)

OTHER PUBLICATIONS

International Search Report and Written Opinion from corresponding PCT application PCT/US2023/013185, dated Jun. 22, 2023 (7 pages).

*Primary Examiner* — Khang Do
(74) *Attorney, Agent, or Firm* — Anderson Gorecki LLP

(57) ABSTRACT

In the context of a co-browse session, one of the participants elects to include a screenshare task in which a screenshare of a browser window displaying a website will be provided to other participants of the co-browse session. When the screenshare task is started, a location of an address bar of the web browser is identified, optional pre-processing is applied to the image of the address bar, and a character recognition process, is used to determine the characters of the URL in the browser's address bar. The URL is compared with a list of allowed website URLs, and the screenshare session is selectively allowed only if the URL is contained in the list of allowed URLs. Once the URL has been approved, a slice of pixels the address bar is obtained and monitored for changes to the pixels that may indicate a change to the URL.

28 Claims, 16 Drawing Sheets

(56) References Cited

U.S. PATENT DOCUMENTS

| | | | |
|---|---|---|---|
| 9,514,333 B1 | 12/2016 | Patel et al. | |
| 10,083,159 B1* | 9/2018 | Bekmambetov | G06F 3/0481 |
| 10,165,022 B1* | 12/2018 | Hubbard | G06F 3/1454 |
| 10,262,327 B1* | 4/2019 | Hardebeck | G06Q 10/10 |
| 10,862,940 B1* | 12/2020 | Jones | H04L 65/1059 |
| 2003/0200442 A1* | 10/2003 | Bhat | H04L 63/102 |
| | | | 713/182 |
| 2012/0036452 A1 | 2/2012 | Coleman et al. | |
| 2014/0108486 A1 | 4/2014 | Borzycki et al. | |
| 2014/0109239 A1* | 4/2014 | Flint | H04L 63/10 |
| | | | 726/27 |
| 2014/0123237 A1* | 5/2014 | Gaudet | H04L 63/205 |
| | | | 726/4 |
| 2015/0149645 A1 | 5/2015 | Mendez et al. | |
| 2015/0149916 A1* | 5/2015 | Mendez | G06F 16/954 |
| | | | 715/738 |
| 2017/0272439 A1* | 9/2017 | Homma | H04L 63/0838 |
| 2018/0219849 A1* | 8/2018 | Jones | H04L 67/53 |
| 2020/0322306 A1* | 10/2020 | Serena | H04L 67/566 |
| 2022/0321616 A1* | 10/2022 | Chopdekar | H04L 65/4015 |
| 2023/0010127 A1* | 1/2023 | Elsner | H04L 12/1813 |
| 2023/0033622 A1* | 2/2023 | Shah | G06F 18/24 |
| 2023/0083996 A1* | 3/2023 | Liu | H04L 65/1093 |
| | | | 709/204 |
| 2023/0216947 A1* | 7/2023 | Bernardi | H04L 63/10 |
| | | | 713/150 |

* cited by examiner

FIG. 3
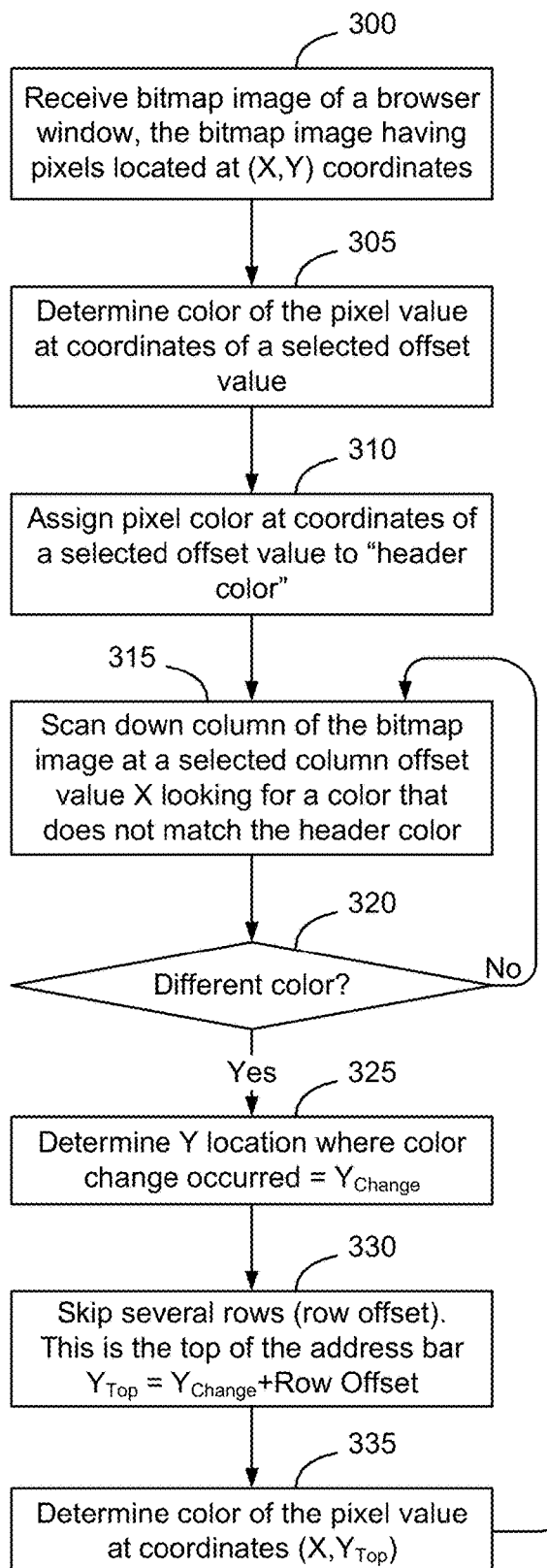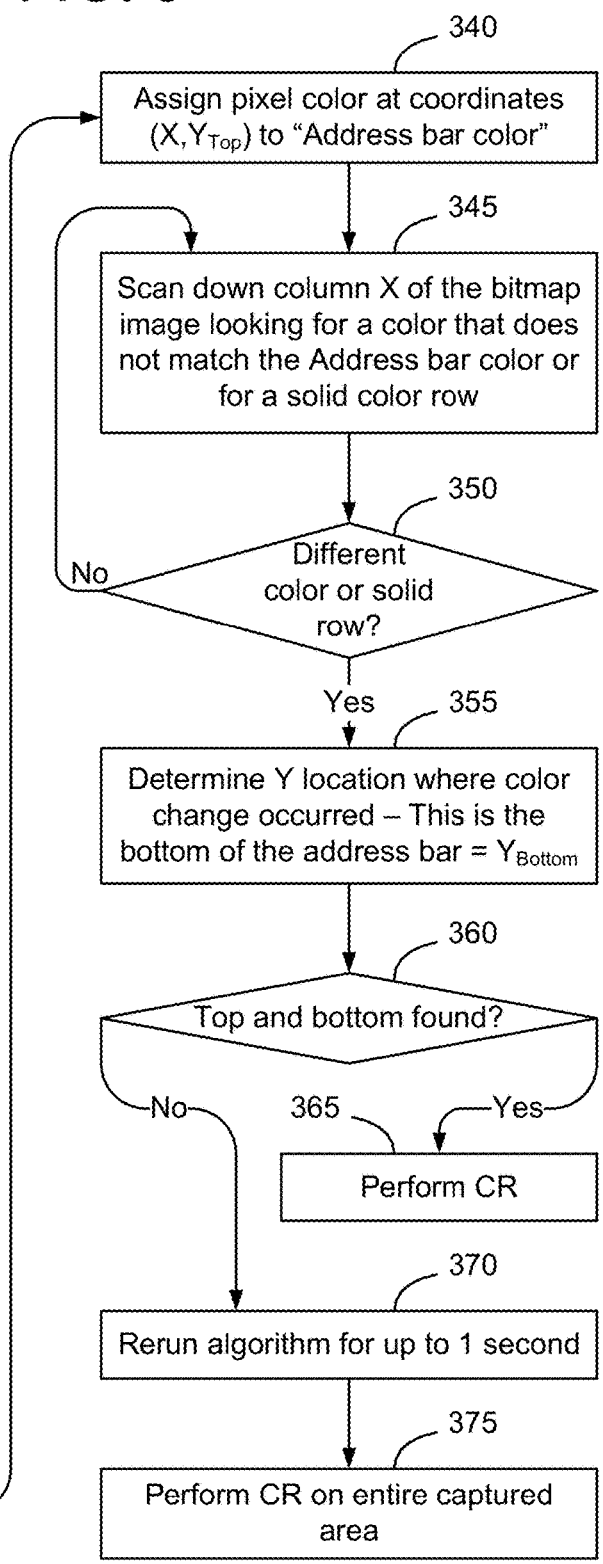

Minor changes to URL = below threshold D

Significant changes to URL = above threshold D

Static Scaling

Dynamic Scaling

Dynamic Binarization

Dynamic Binarization

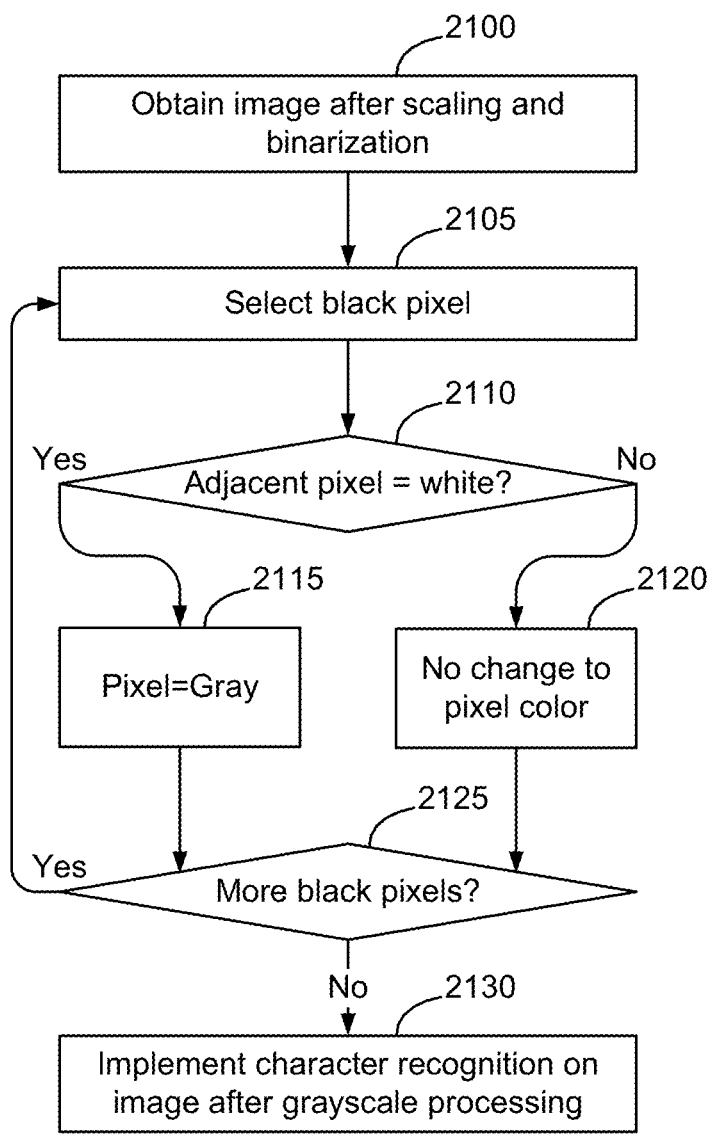

RESTRICTING SCREENSHARE OF WEB PAGES TO SELECT LIST OF ALLOWED WEBSITE URLS

CROSS REFERENCE TO RELATED APPLICATIONS

This application claims priority to U.S. Provisional Patent Application No. 63/310,728, filed Feb. 16, 2022, entitled Restricting Screenshare of Web Pages to Select List of Allowed Website URLs, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to sharing visual information during a communication sessions and, more particularly, to a method and apparatus for restricting screensharing of web pages to a select list of allowed website URLs.

SUMMARY

The Summary and Abstract sections are provided herein to introduce some concepts discussed in the Detailed Description below. The Summary and Abstract sections are not comprehensive and are not intended to delineate the scope of protectable subject matter, which is set forth by the Claims presented below.

All examples and features mentioned below can be combined in any technically possible way.

In the context of a co-browse session, one of the participants elects to include a screenshare task in which a screenshare of a browser window displaying a website will be provided to the other participants of the co-browse session. When the screenshare task is started, an address bar of the web browser is identified and JavaScript in the browser performs character recognition on the full characters of the URL in the address bar. In some embodiments, the character recognition process is implemented using an Optical Character Recognition process, although other character recognition processes can be used as well depending on the implementation. Optionally, instead of performing character recognition locally in the web browser, the portion of the screen containing the determined address bar may be sent to an 0 character recognition CR process external from the agent computer, to enable the external character recognition process to determine the characters contained in the address bar. The URL in the address bar is compared with a list of allowed website URLs. If the URL does not match any URL in the list of allowed website URLs, the screenshare task is paused, such that the other participants are not able to see the content of the website that the one of the participants was attempting to show.

If the URL in the address bar matches one of the URLs in the list of allowed website URLs, the screenshare of the website is allowed, such that the other participants are able to see the content of the website on the co-browse session.

To monitor the browser window for changes to the URL of the website that is being displayed in the browser window, a slice of the address bar is obtained and the characteristics of the slice of the address bar are determined. The slice is then monitored using a linear pixel check algorithm to detect if there are changes to the slice that might indicate that the URL of the address bar has changed, or that a user has moved a cursor over the address bar in preparation to make a change to the URL. If changes to the slice are detected which exceed a threshold, character recognition is performed on the full characters of the URL in the address bar, and the newly determined URL is once again compared with the list of allowed website URLs. The process iterates to ensure that only URLs in the list of allowed website URLs are able to be screenshared during the co-browse session.

In some embodiments, a method of restricting screenshare of web pages to select list of allowed website Uniform Resource Locators (URLs), includes establishing a co-browse session between a first participant and a second participant in which a DOM of a first browser at the first participant is transmitted to the second participant and used at the second participant to recreate a content of the first browser at a second browser, and starting a screenshare task at the second participant, the screenshare task being configured to capture a display of a third browser at the second participant and transmit the captured display of the third browser to the first participant on a screenshare session to cause the view of the third browser to be displayed in a window at the first participant. The method also includes determining an address bar location of the third browser from the captured display of the third browser, using character recognition to identify a URL contained in the address bar of the third browser, and comparing the identified URL with a list of approved URLs to determine if the identified URL is included in the list of approved URLs. In response to a determination that the identified URL is included in the list of approved URLs, enabling the screenshare task at the first participant and at the second participant to enable the captured display of the third browser to be displayed in the window at the first participant on the screenshare session. In response to a determination that the identified URL is not included in the list of approved URLs, preventing the screenshare task at the first participant or at the second participant to prevent the captured display of the third browser from being displayed in the window at the first participant on the screenshare session.

In some embodiments, determining the address bar location of the third browser from the captured display of the third browser includes selecting a column horizontally offset from a left edge of the captured display of the third browser, scanning vertically down the selected column to identify color values of the pixels of the selected column, and identifying a first color change between pixels of the selected column as a top of the address browser. In some embodiments, determining the address bar location of the third browser also includes identifying a second color change between pixels of the selected column as a bottom of the address browser.

In some embodiments, determining the address bar location is implemented by a character recognition process in the third browser. In some embodiments, using character recognition to identify the URL contained in the address bar of the third browser is implemented by the character recognition process in the third browser.

In some embodiments, using character recognition to identify the URL contained in the address bar of the third browser is implemented by transmitting an image of the address bar or an image of a portion of the captured display of the third browser to an external character recognition process. In some embodiments, the external character recognition process is configured to receive the transmitted image, implement optical character recognition on the received image, and return as a response any characters identified in the received image.

In some embodiments, in response to the determination that the identified URL is included in the list of approved URLs, the method further includes monitoring the identified URL to identify any potential changes to the identified URL, and in response to identifying a potential change to the URL repeating the process of using character recognition to identify the URL contained in the address bar of the third browser.

In some embodiments, monitoring the identified URL to identify any potential changes to the identified URL includes implementing a linear pixel check on the address bar of the third browser. In some embodiments, the linear pixel check includes monitoring the content of a slice of the address bar. In some embodiments, monitoring the content of a slice of the address bar includes identifying a first row of pixels horizontally intersecting the characters of contained within the address bar, determining optical characteristics of the first row of pixels to create a baseline set of optical characteristics of the first row of pixels, periodically scanning the first row of pixels to determine current optical characteristics of the first row of pixels, and comparing the current optical characteristics of the first row of pixels with the baseline set of optical characteristics of the first row of pixels to determine if the current optical characteristics of the first row of pixels is different than the baseline set of optical characteristics of the first row of pixels. In some embodiments, the determined optical characteristics include color values of the pixels, and determining if the current optical characteristics of the first row of pixels is different than the baseline set of optical characteristics of the first row of pixels includes determining if an average of the color values of the current optical characteristics is different than an average of the color values of the baseline optical characteristics. In some embodiments, the determined optical characteristics include color or luminance values of each of the pixels, and determining if the current optical characteristics of the first row of pixels is different than the baseline set of optical characteristics of the first row of pixels includes performing a pixel-by-pixel comparison to determine if the color or luminance value of individual pixels of the current optical characteristics are different than corresponding individual pixels of the baseline optical characteristics.

In some embodiments, in response to a determination that the identified URL is not included in the list of approved URLs, the method further includes determining a first URL in the list of approved URLs that is most similar to the identified URL, identifying a set of mismatched characters in the identified URL that are different from characters of the first URL, determining locations of the set of mismatched characters in the identified URL that are different from characters of the first URL, locally expanding a size of the address bar in the determined locations of the mismatched characters to create an expanded address bar, using character recognition to identify a second URL contained in the expanded address bar of the third browser, and comparing the identified second URL with the list of approved URLs to determine if the identified second URL is included in the list of approved URLs. In some embodiments, using character recognition to identify the second URL includes implementing character recognition only on the set of mismatched characters.

In some embodiments, establishing the co-browse session includes creating a first entry in a Customer Relationship Management (CRM) record identifying the co-browse session, and establishing the screenshare session includes creating a second entry int the CRM record. In some embodiments, the second entry contains the URL of the third browser. In some embodiments, the second entry contains an indication as to whether the URL of the third browser was included in the list of approved URLs or was not included in the list of approved URLs.

In some embodiments, starting the screenshare task includes pausing the screenshare task to not capture the display of the third browser and not transmit the captured display of the third browser until after comparing the identified URL with the list of approved URLs, determining that the identified URL is included in the list of approved URLs, and enabling the screenshare task.

In some embodiments, starting the screenshare task includes capturing the display of the third browser, transmitting the captured display of the third browser to the first participant, and disabling display of the captured display at the first participant, prior to completion of comparing the identified URL with the list of approved URLs, and enabling the screenshare task at the first participant includes enabling display of the captured display at the first participant.

In some embodiments, the method further includes creating an image of the address bar by cropping the captured image of the display of the third browser based on the determined address bar location, and pre-processing the image of the address bar prior to using the character recognition process to identify the URL contained the image of the address bar. In some embodiments, pre-processing includes scaling the image of the address bar using a static scaling process or a dynamic scaling process. In some embodiments, the static scaling process includes scaling the image of the address bar to cause the image of the address bar to have a predefined resolution.

In some embodiments, the dynamic scaling process includes iteratively scaling the image of the address bar to different resolutions and performing character recognition on the iteratively scaled image until a resolution is identified that enables the character recognition process to identify characters within the image of the address bar.

In some embodiments, pre-processing includes binarizing the image of the address bar using a static binarization process or a dynamic binarization process. In some embodiments, the static binarization process includes binarizing the image of the address bar using a predefined threshold to cause the pixels of the address bar to have either a black or a white value depending in dependence on the predefined threshold. In some embodiments, the dynamic binarization process includes iteratively selecting a binarization threshold, binarizing the image of the address bar using the selected binarization threshold to cause the pixels of the address bar to have either a black or a white value depending in dependence on the selected threshold, and performing character recognition on the iteratively binarized image until a binarization threshold is identified that enables the character recognition process to identify characters within the image of the address bar.

In some embodiments, pre-processing the image of the address bar further includes applying a grayscale process to the binarized image to change white pixels that are adjacent to black pixels to have a gray color.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 is a flow chart of an example process of locating an address bar of a browser window in a screenshare session, according to some embodiments.

FIG. 21 is a flow chart of example grayscale processing that may be used in connection with the process of performing character recognition shown in FIG. 15, according to some embodiments.

DETAILED DESCRIPTION

The following detailed description sets forth numerous specific details to provide a thorough understanding of some embodiments of the invention. However, those skilled in the art will appreciate that the invention may be practiced without these specific details. In other instances, well-known methods, procedures, components, protocols, algorithms, and circuits have not been described in detail so as not to obscure the invention.

Overview

Figure 1:
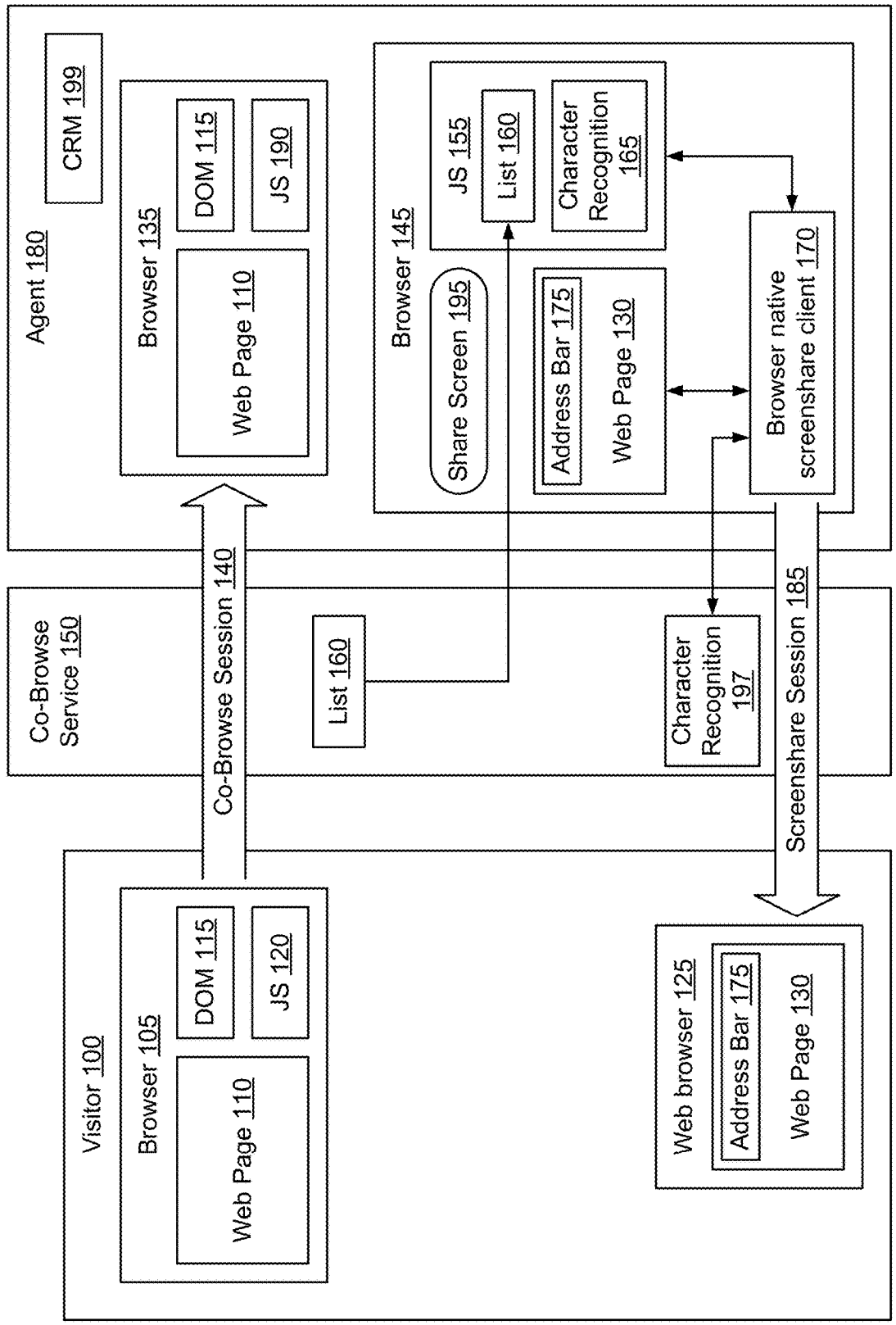
FIG. 1 is a functional block diagram of a co-browsing environment including a visitor and agent, according to some embodiments.

FIG. 1 is a functional block diagram of a co-browsing environment including a visitor computer 100 and an agent computer 180, according to some embodiments. As shown in FIG. 1, in some embodiments a visitor computer 100 has a browser 105 that has loaded a web page 110. DOM 115 is created by the browser 105 to describe the web page 110. Co-Browse JavaScript 120 is loaded to the browser 105 in the context of the web page 110, and is configured to forward the DOM 115 on a co-browse session 140 to enable the DOM to be used to recreate the web page 110 in a browser 135 on agent computer 180. In some embodiments, agent co-browse JavaScript 190 is provided in agent browser 135 to manage participation of the agent computer 180 on the co-browse session. By sharing the DOM 115 of the visitor browser 105 with the agent browser 135, it is possible for the agent browser 135 to show the content of the web page 110 on agent computer 180. In some embodiments, the co-browse session 140 is facilitated by a co-browse service 150. Additional details associated with creating and using co-browse sessions and the co-browse service are described in U.S. Pat. No. 9,736,214, entitled Integrating Co-Browsing with Other Forms of Information Sharing, the content of which is hereby incorporated herein by reference.

There are instances, in the context of a co-browse session, where the agent at the agent computer 180 might want to share content back to the visitor computer 100. For example, the agent might want to start a separate browser 145 and show the content of the browser 145 back to the visitor computer 100 in the context of the co-browse session 140.

However, in an enterprise setting, for example where the agent is providing support for a particular company, the company might want to restrict which addresses the agent is able to show to the visitor in the context of the co-browse session 140. Further, the web page that the agent wants to show might not be instrumented with co-browse JavaScript, and thus not readily shared using co-browse technology.

For example, as shown in FIG. 1, the agent might start a separate browser 145, load a web page 130 to the browser 145, and use a screenshare feature 195 of the browser 145 and browser native screenshare client 170 to show the content of the web page 130 to the visitor on a screenshare session 185. On the visitor computer 100, a new window 125 will be opened in which the content of the web page 130 will appear via the screenshare session 185. Window 125 may be implemented using a web browser or other window that is configured to display the content of the screenshare session.

According to some embodiments, the co-browse service 150 provides a list of allowed website URLs 160 to the agent computer 180. The content of the list 160 may be configured, such that different lists 160 are provided to different agent computers 180, or such that a particular list 160 of allowed websites are provided to all agent computers being used by agents that are working for a particular company. The list of allowed website URLs 160, in some embodiments is implemented using JavaScript 155 that also includes character recognition software 165, such as Optical Character Recognition (OCR) software. Although some embodiments are described herein in which the character recognition software 165 is implemented using optical character recognition software, it should be understood that other types of character recognition processes can be utilized as well, depending on the implementation. When the browser 145 is started on the agent computer 180, or when the share screen function 195 of the browser 145 is activated, the character recognition process 165 identifies the address bar 175 of the browser 145 to determine the URL of the web page 130 that has been loaded to the browser 145. The JavaScript 155 compares the determined URL of the web page 130 with the list of allowed website URLs 160, and if the determined URL from the address bar 175 is not in the list of allowed website URLs 160, the screenshare task is paused or ended.

Optionally, as shown in FIG. 1, in some embodiments an external character recognition process 197 is used instead of character recognition process 165 or in addition to character recognition process 165 to implement character recognition on the identified address bar 175. The external character recognition process 197 may be implemented on a server, such as one of the servers implementing the co-browse service 150, or on a dedicated server or webservice. Once the address region of the browser is located, a HTTP request is transmitted to the character recognition service 197, sending the server only the image of the address bar. In response, the character recognition service 197 returns the characters identified in the image of the address bar, to enable the identified characters to be compared with the list of allowed website URLs 160.

Browser Window

Figure 2:
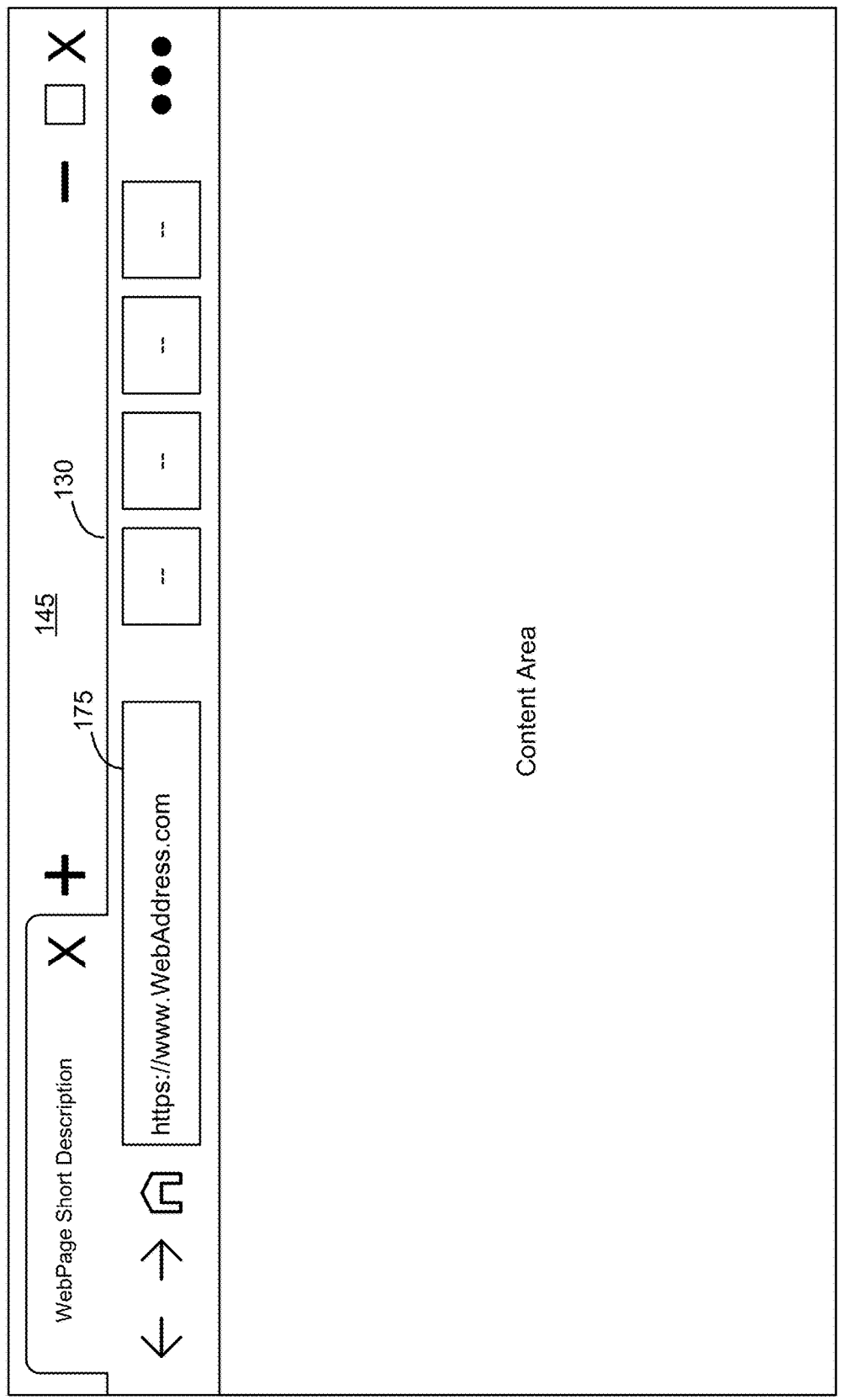
FIG. 2 is a functional block diagram of an example browser window including an address bar, according to some embodiments.

FIG. 2 is a functional block diagram of an example browser window 145 including an address bar 175, according to some embodiments. As shown in FIG. 2, in some embodiments a browser 145 includes a web page 130 and an address bar 175. The address bar 175 is generally located at the top, left, of the web page 130, and identifies the URL that was used to locate the web page 130 on the Internet or Intranet. If a browser native screenshare client 170 is used to show the content of the browser 145 on a screenshare session 185, the browser native screenshare client 170 will capture the entire content of the browser 145, including the address bar 175.

Locate Address Bar

In some embodiments, character recognition process 165 uses the output from the browser native screenshare client 170 to locate the address bar 175 and to identify the characters that appear in the address bar 175. One example process of locating the address bar is set forth below in connection with FIG. 3. The URL that is identified using character recognition process 165 is compared with the list of allowed website URLs 160 to ensure that the agent computer 180 is only showing a website on the screenshare session 185 that has been pre-approved. In this manner, the content that is shown by the agent computer 180 to the visitor computer 100 may be constrained to a specified set of URLs so that the agent is not able to provide extraneous content in the context of the co-browse session 140.

There might be several ways to attempt to locate the address bar of the browser window. For example, most browsers have the address bar at the top. In some embodiments, the character recognition process 165 initially begins character recognition processing in a region where the address bar is likely to be located and, once the address bar is located, the coordinates of the address bar are stored for future processing.

For character recognition to work correctly, the character recognition process requires a clean sample, with ideally just the text that is of interest. For example, it is preferable to only input the address bar to the character recognition process, and not to include other text such as text from the title bar or other areas of the website. By looking for the top and bottom areas of the address bar using the process described in connection with FIG. 3, it is possible to closely approximate the region of the screen where the address bar is likely to be located.

FIG. 3 is a flow chart of an example process of locating an address bar from a bitmap image of a browser window in a screenshare session, according to some embodiments. In some embodiments, the process shown in FIG. 3 enables the address bar to be located in multiple types of browsers, on both Mac and PC computers, and for both tabbed browser windows as well as popup style browser windows.

As shown in FIG. 3, in some embodiments the address bar location process receives a bitmap image of a browser window (block 300). The bitmap image will be referred to herein as having pixels that are located at (X,Y) coordinates for ease of explanation.

The address bar location process then determines the color of the pixel at a selected offset value, such as at coordinates (10, 2) (block 305). This pixel is inside any border or rounded corner, but above any icon, or Mac traffic lights, on the left of the header bar, and therefore represents the background color of the header bar. The color of the pixel at a selected offset value, e.g., at coordinates (10,2), is assigned to the "header color" (block 310).

The address bar location process scans down a column at a selected column offset of the image bitmap, looking for a color that does not match the header color (block 315). An example column offset may be X=10, although the particular column offset may depend on the implementation and the characteristics of the browser. In some embodiments, a small tolerance in color matching is allowed. For each pixel, a determination is made as to whether the pixel is a different color from the header color (block 320). If the color of the pixel is the same or substantially the same as the header color (a determination of NO at block 320) the process continues to the next vertical pixel below. If the color of the pixel is different than the header color (a determination of YES at block 320), the address bar location process determines the Y location where the color change occurred (block 325). This location is referred to herein as $Y_{change}$ for ease of explanation.

The address bar location process skips down a number of rows (row offset) from the $Y_{change}$ location, and sets that location as the top of the address bar: $Y_{Top}=Y_{Change}+$Row Offset (block 330). Skipping a number of rows equal to the row offset allows for a boundary between the header and URL area. In some embodiments the row offset is six rows of pixels, although the particular row offset may depend on the implementation and the characteristics of the browser. The color of the pixel at $Y_{Top}$ is determined (block 335), and the pixel color at coordinates (10, $Y_{Top}$) is assigned to the "address bar color" (block 340).

After determining the color of the address bar, the address bar location process scans down the column of the selected offset value, e.g., X=10, looking for either a pixel that has a color that does not match the address bar color, or looking for a row in the bitmap that has a solid color (block 345). If the color of the pixel is the same as the address bar color (a determination of NO at block 350) the process continues to the next vertical pixel below. If the color of the pixel is different than the address bar color or if a solid row is encountered (a determination of YES at block 350), the address bar location process determines the Y location where the color change or solid row occurred (block 355). This is the bottom of the address bar area. The location of the bottom of the address bar is referred to herein as $Y_{Bottom}$.

A determination is made as to whether the coordinates of the top ($Y_{Top}$) and bottom ($Y_{Bottom}$) were detected by the address bar location process (block 360). If both the top coordinate of the address bar ($Y_{Top}$) and the bottom coordinate of the address bar ($Y_{Bottom}$) were detected (a determination of YES at block 360), the Character Recognition (CR) process 165 can use these coordinates to perform Character Recognition (CR) operations in a region of the bitmap bounded by the determined address bar top $Y_{Top}$ and bottom $Y_{Bottom}$ coordinates (block 365). In some embodiments, the character recognition process includes image pre-processing to increase accuracy of the character recognition process on the determined address bar, as described in greater detail in connection with FIGS. 15-21.

If either the top coordinate of the address bar ($Y_{Top}$) or the bottom coordinate of the address bar ($Y_{Bottom}$) were not detected (a determination of NO at block 360), in some embodiments, the address bar location process iterates for an iteration interval, e.g., up to 1 second, to continue to attempt to locate the top and bottom coordinates of the address bar (block 370). In windows, for example, while a window is being activated on the desktop, there are interim frames that may be captured where all or part of the window header is all white. To accommodate this, the algorithm is periodically re-run during the iteration interval, looking for a successful identification of the URL (address bar) area. If the address bar location process is ultimately not successful, the character recognition process can be used to perform a character recognition operation on the entire captured area (block 375).

In some embodiments, if the agent computer 180 selects a new browser window 145 to share, the address bar location process described in connection with FIG. 3 is used to recalculate the URL boundary of the new window. If the agent restarts a new share session, the agent might choose to share a popup browser, or a tabbed browser window. If the agent shares a popup browser window, the process of determining the URL area set forth above can be used to determine the location of the address bar. If the agent opens a new tab in the browser window, the location of the address bar might change, which might require the process of determining the location of the browser window to be dependent on the type of window being used to show the selected URL.

In some browsers, the size of the address bar is not changed, and the location of the address bar is not changed when the browser window is resized. Accordingly, in some embodiments it is not necessary to repeat the address bar location process in connection with window resizing actions.

Character Recognition Process on Address Bar

Figure 4:
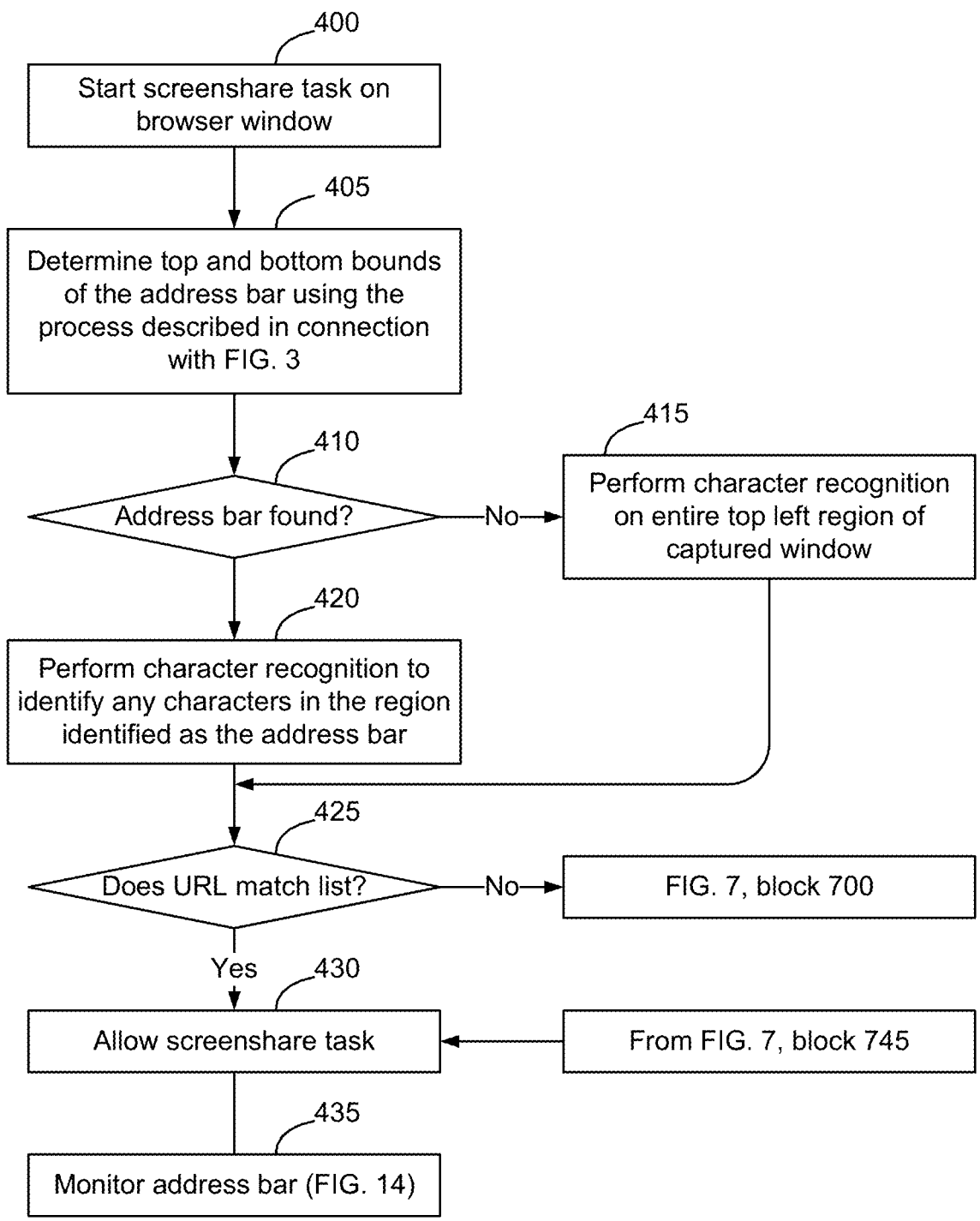
FIG. 4 is a flow chart of an example process of restricting screenshare of web pages to a select list of allowed website URLs, according to some embodiments.

FIG. 4 is a flow chart of an example process of restricting screenshare of web pages to a select list of allowed website URLs, according to some embodiments. As shown in FIG. 4, when a screenshare task is started on a browser window (block 400), the character recognition process 165 in the browser will receive the screenshare information from the browser native screenshare client 170 and will attempt to locate the address bar 175 of the browser window, for example using the process described in connection with FIG. 3 (block 405).

There are instances where the character recognition process 165 will not be able to locate the address bar of the browser window. For example, if the screenshare task is started in a tab of the browser window, it is possible that the address bar will not appear on the content of the screenshare session. Similarly, in some browsers it is possible to hide the address bar 175. Accordingly, if the character recognition process 165 is not able to find the address bar (a determination of NO at block 410), in some embodiments the character recognition process 165 is used to perform character recognition on the entire top left region of the captured window (block 415). The characters identified by the character recognition process 165 by performing the character recognition process on the top left region of the captured window are then compared against the list of allowed website URLs (block 425).

If the character recognition process 165 is able to locate the address bar (a determination of YES at block 410) the character recognition process 165 performs a character recognition process on the full characters of the URL in the address bar (block 420). In some embodiments, the image bounded by the coordinates of the determined address bar are used to clip the image, and image preprocessing steps such as scaling and binarization are applied to the image of the address bar, prior to performing character recognition, as described in greater detail in connection with FIGS. 15-21. The characters identified by the character recognition process 165 are then compared against the list of allowed website URLs (block 425). If the determined URL does not match one of the URLs in the list of allowed website URLs 160 (a determination of NO at block 425), the process continues to FIG. 7, block 700.

Although FIG. 4 describes some embodiments in which the character recognition process is implemented locally on the agent computer 180, in some embodiments the character recognition process can be implemented external to the agent computer 180. For example, as shown in FIG. 1, in some embodiments an external process 197 can be used to implement the character recognition part of the process once the address bar has been determined (block 420) or in situations where the address bar is not able to be located (block 415).

For example, in instances where the character recognition process determines that it is not able to identify the location of the address bar (a determination of NO at block 410), the image of the entire top left region of the captured window is sent to the external character recognition process 197 to request that the external character recognition process return any identified characters contained in that region. The identified characters are then compared against the list of allowed websites (block 425) to selectively allow or disallow the screenshare session. Similarly, in instances where the character recognition process determines that it is able to identify the location of the address bar (a determination of YES at block 410), an image of the region identified as containing the address bar is sent to the external character recognition process 197 to request that the external character recognition process return any identified characters contained in the address bar. The identified characters are then compared against the list of allowed websites (block 425) to selectively allow or disallow the screenshare session. Using an external character recognition process 197 may be advantageous, for example in situations where the agent computer 180 has insufficient processing resources to implement the required character recognition aspects of process 165.

If the determined URL matches one of the URLs in the list of allowed website URLs 160 (a determination of YES at block 425) the screenshare task is allowed to proceed to share the content of browser 145 on screenshare session 185 (block 430). In some embodiments, the character recognition process 165 monitors the content of the address bar 175 to detect possible changes to the URL (block 435). Some example ways to monitor the content of the address bar are described in greater detail in connection with FIGS. 8-14.

There are instances where the process of determining the top and bottom of the address bar 175, and running the character recognition process on the selected region, can result in inaccurate determination of the characters of the URL that has been typed into the address bar 175. For example, if the bottom of the address bar 175 is incorrectly determined to not coincide with the actual bottom of the address bar, the character recognition process may misinterpret one or more of the letters, since the bottom of the letter will be cropped. Similarly, if the process of determining the top of the address bar determines an incorrect value, the top of several of the letters of the URL may be cropped.

Figure 5:
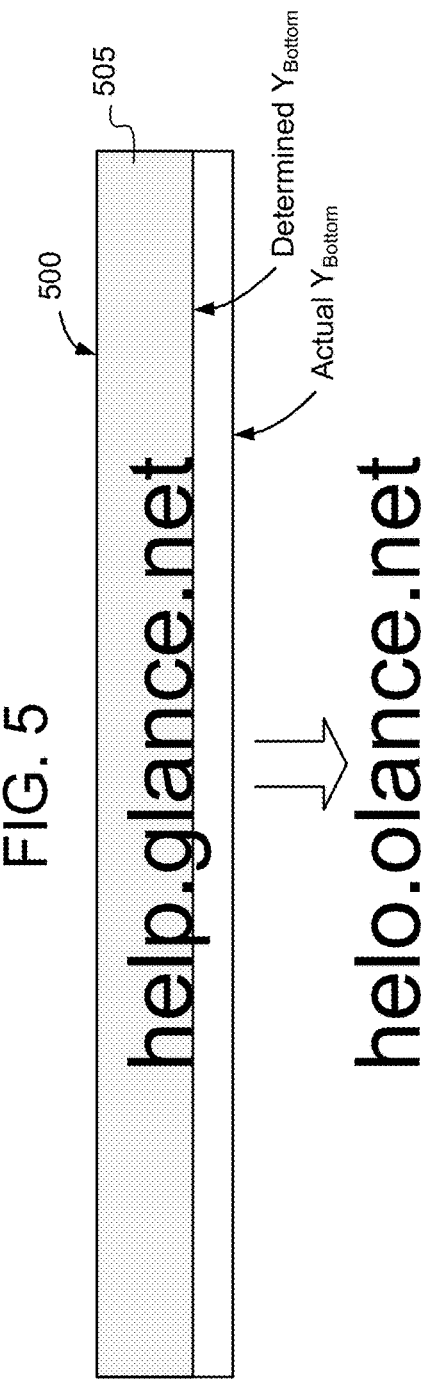
FIG. 5 is a block diagram of an address bar, showing example character recognition errors that can occur if the character recognition process is run on a truncated portion of the address bar, according to some embodiments.

An example of this is shown in FIG. 5. As shown in FIG. 5, the outer box 500 is the actual address bar. However, when detecting the upper and lower bounds of the address bar, the character recognition process incorrectly set the bottom of the address bar (Determined $Y_{Bottom}$) at a location within the address bar that is not coincident with the actual bottom of the address bar (Actual $Y_{Bottom}$). The partially grayed out region 505 in FIG. 5 represents the area of the screen that the character recognition process has determined to be the address bar. When the character recognition process is run on the gray portion 505, the bottom portion of the letters "p" and "g" will be cut off, thus causing those letters to appear to be the letter "o". Accordingly, instead of having the character recognition process identify the URL as "help.glance.net", the character recognition process may instead determine that the URL that is contained in the address bar is "helo.olance.net". Similar issues may occur in connection with other letters, such as the letter "y" being interpreted as a "v". Although some examples have been provided in which incorrectly determining the bottom of the address bar can similarly lead to incorrect character recognition results, similar errors may occur if the top of the address bar is incorrectly determined. For example, the letters "b", "d" may be cropped and appear to the character recognition process to be the letter "o", and the letter "h" may appear to be the letter "n".

Accordingly, there are times when incorrectly determining the size of the address bar can cause the character recognition process to incorrectly interpret the address of the URL that is contained in the address bar. If the character recognition process reads the wrong URL, it is unlikely that the URL will match one of the addresses in the list of allowed URLs and result in a determination of NO in at block 425 of FIG. 4.

Figure 6:
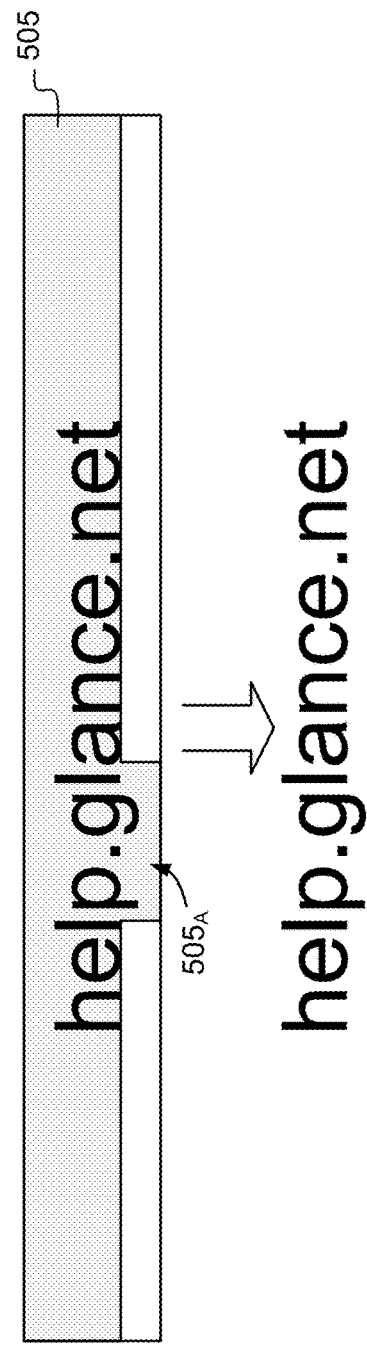
FIG. 6 is a block diagram of an address bar, showing local adjustment of the portion of the address bar on which character recognition process is run to reduce the number of character recognition errors by the character recognition process, according to some embodiments.

In some embodiments, if the determined URL does not identically match a URL that is contained in the list of allowed URLs, but partially matches a URL that is contained in the list of allowed URLs, a determination is made as to the location of the characters in the determined URL that don't match the characters of the corresponding URL in the list of allowed URLs. For example, as shown in FIG. 6, an area 505A is added to the region of the determined address bar in the area surrounding the mismatched characters, and character recognition is performed on the newly enlarged address bar area. By enlarging the region of the address bar in the vicinity of the mismatched characters, it is possible to reduce the number of incorrect URL determinations.

Accordingly, if the first character recognition response returns a close match to a URL that is in the list of approved URLs, the identity of the mismatched characters can be determined. The character recognition process knows the coordinates of the mismatched characters (upper left coordinate and lower right coordinate in some embodiments), which defines a rectangle around the coordinate. By expanding this rectangle, and performing character recognition on the expanded rectangle, it is possible to determine if the character recognition process detects a different character.

Figure 7:
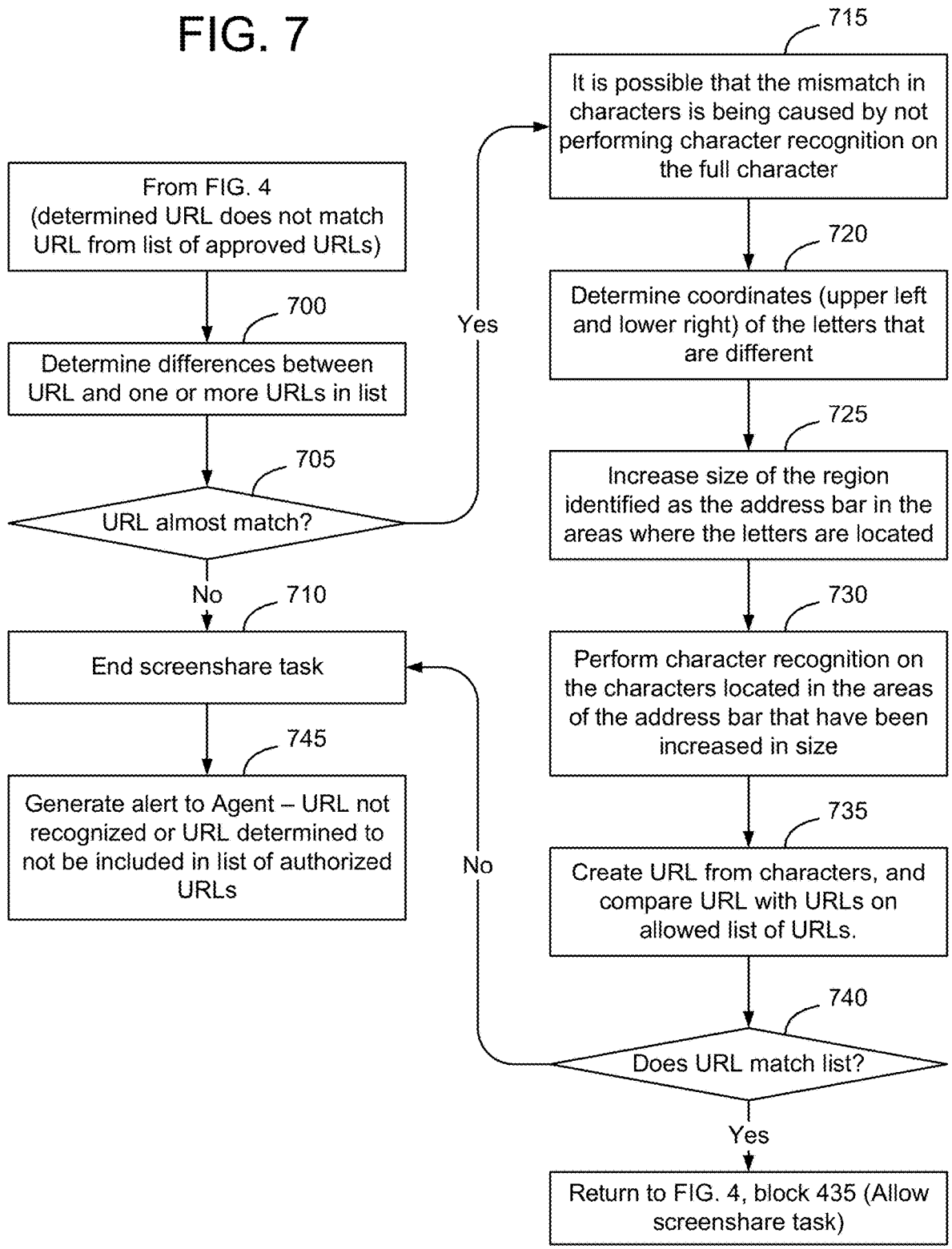
FIG. 7 is a flow chart of an example process of adjusting a size of the address bar in connection with determining the characters contained in an address bar, according to some embodiments.

FIG. 7 is a flow chart of an example process of regionally adjusting a size (height) of the address bar in connection with determining the characters contained in an address bar, according to some embodiments. As shown in FIG. 7, if the determined URL does not match one of the URLs in the list of approved URLs (a determination of NO at FIG. 4, block 425), rather than automatically ending the screen share session, in some embodiments the process determines the differences between the determined URL and one of the URLs in the list of approved URLs (block 700). A determination is then made if the determined URL is a close match to one of the URLs in the list of approved URLs (block 705). There may be many ways to determine whether the determined URL is similar to one of the URLs in the list of approved URLs. In some embodiments, one or more similarity rules may be applied to evaluate the differences between the determined URL and the selected URL from the list of approved URLs. Example similarity rules may be whether the two URLs have the same number of characters, whether the two URLs have more than a threshold number of characters in the same position, and possibly other similarity rules depending on the implementation.

If the determined URL is not sufficiently similar to one of the URLs in the list of approved URLs (a determination of NO at block 705) the screenshare process ends (block 710). Optionally, a notice may be provided to the Agent to alert the agent that the screenshare of the browser window was not successful because the URL included in the address bar was not recognized or was determined to be not authorized to be shared on the screenshare session (block 745). If the determined URL is sufficiently similar to one of the URLs in the list of approved URLs (a determination of YES at block 705) it is possible that the mismatch in characters is being caused by not performing the character recognition process 165 on the full characters (block 715). Accordingly, in some embodiments, the coordinates of the letters in the determined URL that don't match the characters of the URL in the list of approved URLs are determined (block 720). The coordinates of the characters are known to the character recognition process 165, because the character recognition process 165 previously determined the location and value of the character when initially performing the character recognition process 165 to identify the characters.

The character recognition process 165 then increases the size of the region considered by the character recognition process 165 in the vicinity of the characters (block 725) and the character recognition process 165 is re-run on the region of increased size (block 730) to determine if the character recognition process 165 is able to detect the presence of a different character when considering the larger region.

The newly determined URL is then created from the characters identified by the character recognition process 165, and the newly determined URL is compared with the URLs on the list of allowed URLs (block 735). A determination is then made as to whether the newly determined URL matches one of the URLs in the list of approved URLs (block 740). If the newly determined URL matches one of the URLs in the list of approved URLs, (a determination of YES at block 740) the screenshare session is allowed to proceed and the process returns to FIG. 4, block 435. If the newly determined URL does not match one of the URLs in the list of approved URLs (a determination of NO at block 740), the screenshare session ends (block 710). Optionally, instead of ending the screenshare session, if the newly determined URL does not match one of the URLs in the list of approved URLs, the process may return to block 725 to further increase the size of the address window on which the character recognition process 165 is being performed, and iterate until it is clear that the URL determined by the character recognition process 165 is not included in the list of approved URLs. For example, if increasing the size of the region on which the character recognition process 165 performs character recognition does not result in a change to the character detected in that region, the process may conclude that the character recognition process 165 is sufficiently accurate, and the screenshare session may end (block 710). Optionally, a notice may be generated and provided to the agent to alert the agent that the screenshare session was not implemented (block 745).

URL Capture

In some embodiments, any URL recognized by the character recognition process (whether the URL is an allowed URL or a disallowed URL) is captured and added to a record in an instance of Customer Relationship Management (CRM) software 199 running on the Agent computer 180. For example, in some instances the Agent might be running CRM software 199 which automatically captures interactions between the agent and visitors, and updates records associated with the visitors to enable the CRM software 199 to keep track of multiple aspects of the interactions between the agents and visitors. In some embodiments, if a co-browse session 140 is used when the agent is talking to the visitor, the use of the co-browse session 140 is captured and added to a CRM record in the CRM system 199. If a screenshare session 185 showing a website 130 is added to the co-browse session 140 or attempted to be used in connection with the co-browse session 140, in some embodiments the use of the screenshare session 185 is also added to the CRM record for the visitor in the CRM system 199.

Likewise, if the character recognition process determines that a URL matches one of the approved URLs, and the screenshare session 185 is used, in some embodiments the identity of the website that was shared is captured, and the URL of the website or other information identifying the website is added to the CRM record for the visitor in the CRM system 199. In some embodiments, if a screenshare session is attempted and the character recognition process 165 determines that the URL was not on the list of allowed URLs, the disallowed URL may be captured and added to the CRM record for the visitor in the CRM system 199. Alternatively, the disallowed URL may be captured in another CRM record that is created specifically to keep track of disallowed URLs, thereby allowing reports correlating agents and disallowed URLs to be readily generated.

Startup Considerations

Performing character recognition on the address bar can take a finite amount of time. For example, determining the location of the address bar and performing an initial character recognition process on the address bar might take several seconds. During this initial time, in some embodiments the screenshare session 185 is paused on the agent side to prevent information describing the web page 130 from being transmitted by the agent computer 180 to the visitor computer 100 on screenshare session 185. Alternatively, an initial full screen transmission might be transmitted by the agent computer 180 to the visitor computer 100 while the initial character recognition process is being implemented. In this alternate embodiment, the initial screen describing the content of the website is forwarded from the agent computer 180 to the visitor computer 100, but is not displayed in window 125 on the visitor computer 100, until the character recognition process has been completed and the JavaScript 155 has verified that the URL contained in the address bar 175 matches one of the URLs in the select list of allowed website URLs 160. Control signals between the agent computer 180 and the visitor computer 100 on screenshare session 185 can be used to restrict display of the web page 130 in window 125 to prevent the screenshare from being displayed in the window on the visitor computer until after verification of the URL from address bar 175 against the list of approved URLs 160.

Monitoring Address Bar—Linear Pixel Check

Because performing character recognition on the address bar 175 takes a finite amount of time, in some embodiments the JavaScript 155 is configured to only monitor the address bar 175 for changes to the address bar once the URL that is contained in the address bar has been verified to be one of the URLs contained in the select list of allowed website URLs 160.

For example, in some embodiments the character recognition process 165 obtains a slice of the address bar, and determines characteristics of the slice of the address bar. The slice is then monitored using a linear pixel check algorithm to detect if there are changes to the slice that might indicate that the URL of the address bar has changed, or that a user has moved a cursor over the address bar in preparation to make a change to the URL.

As used herein, the term "linear pixel check" is used to refer to a process that monitors the content of the address bar by monitoring the content of a slice of the address bar. The content of the slice may be monitored in several ways. In some embodiments, the content of the slice is monitored by performing a pixel-by-pixel comparison of the slice of the address bar over time. Some of the pixels of the slice are used to display the portions of the characters that comprise the URL and other pixels are used to display the background color of the address bar. By determining if any of the pixels has changed, it is possible to infer that the letters forming the URL may have changed, to enable the character recognition process to be re-run on the address bar. The content of the slice may also be monitored by characterizing the pixels of the slice at an initial time, and monitoring the slice for changes to the characterization. For example, the slice will contain a number of pixels, each of which will have one or more color values such as red, green, and blue values, as well as other values such as brightness values. The content of the slice may be characterized by determining an average red, green, and blue values of the pixels contained in the slice, or the average luminance/brightness values, and then the average color values of the pixels of the slice may be monitored over time.

If the average pixel value of the slice changes sufficiently to exceed a threshold D, the character recognition process is used to determine the full characters of the URL in the address bar, and the new URL is once again compared with the previously determined URL or compared with the set of URLs contained in the list of allowed website URLs 160. The process iterates to ensure that only URLs in the list of allowed website URLs are able to be screenshared during the co-browse session. By monitoring a strip of pixels, it is possible to detect changes to the URL in the address bar, but monitoring a strip of pixels is much less computationally intensive than iteratively utilizing the character recognition process to continuously re-read the URL contained in the address bar.

Figure 8:
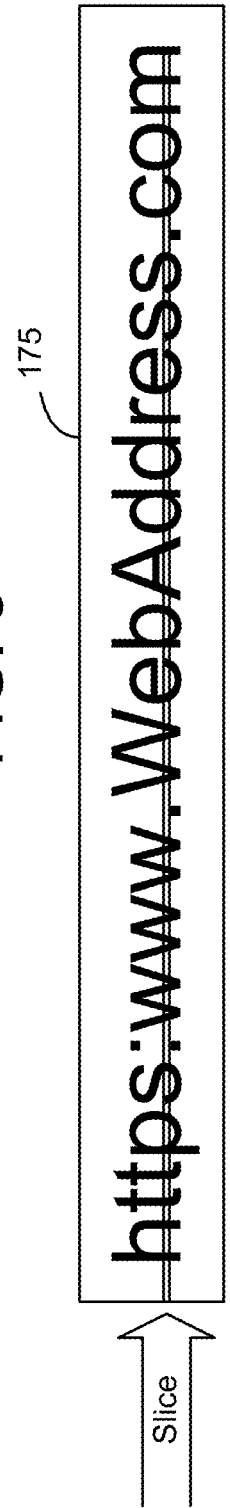
FIG. 8 is a block diagram of the address bar of the browser window of FIG. 2, and showing identification of a slice of the address bar, according to some embodiments.
Figure 9:
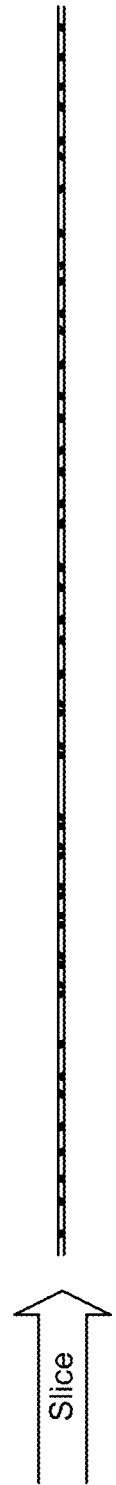
FIG. 9 is a block diagram of the slice of the address bar of FIG. 2, according to some embodiments.

FIG. 8 is a block diagram of an example address bar 175 of the browser window 145 of FIG. 2, and showing identification of a slice of the address bar, according to some embodiments. FIG. 9 is a block diagram of the slice of the address bar of FIG. 8, according to some embodiments. As shown in FIG. 8, taking a slice of the address bar, and determining the content of the slice of the address bar, is sufficient to detect changes to the URL contained in the address bar 175. For example, as shown in FIG. 9, the content of the slice will show portions of the characters of the URL contained in the address bar 175 as well as portions of the background color of the address bar. In some embodiments, the slice of the address bar is implemented using one row of pixels through the address bar that is selected to intersect the characters of the URL. In some embodiments, the slice of the address bar is implemented using multiple rows of pixels through the address bar that may or may not be vertically contiguous. For example, although a single slice is shown in FIG. 8, it should be understood that two horizontal slices may be used as well, depending on the implementation.

Figure 10:
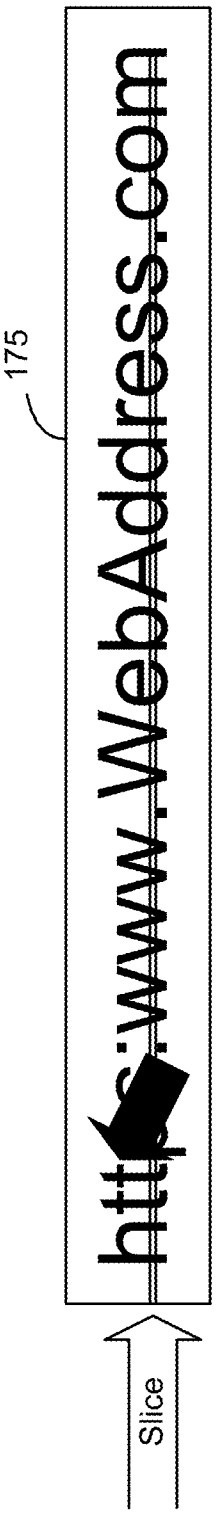
FIG. 10 is a block diagram of the address bar of the browser window of FIG. 2 in which a cursor has been moved over the address bar, and showing identification of a slice of the address bar, according to some embodiments.
Figure 11:
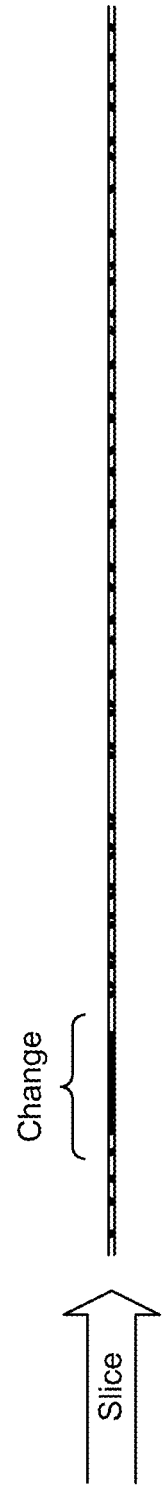
FIG. 11 is a block diagram of the slice of the address bar of FIG. 10, according to some embodiments.

FIG. 10 is a block diagram of the address bar of the browser window of FIG. 2 in which a cursor has been moved over the address bar, and showing identification of the same slice of the address bar as was determined in FIG. 8, according to some embodiments. FIG. 11 is a block diagram of the slice of the address bar of FIG. 10, according to some embodiments. As shown in FIG. 11, the mere presence of the cursor over the address bar will result in a change to the slice that is being monitored. By monitoring the slice using a linear pixel check algorithm to look for changes to the content of the slice over time, it is possible to detect potential changes to the URL in the address bar 175. Any time a change to the slice is detected that exceeds a particular threshold D, for example if the average pixel value changes by more than 2%, a full character recognition process may be repeated on the address bar to enable the current URL of the address bar to be compared against the list of approved website URLs. Monitoring a slice of the address bar 175 is significantly less computationally intensive, thus allowing the character recognition process to continue monitoring the address bar URL while enabling a higher frame rate on the screenshare session 185.

Figure 12:
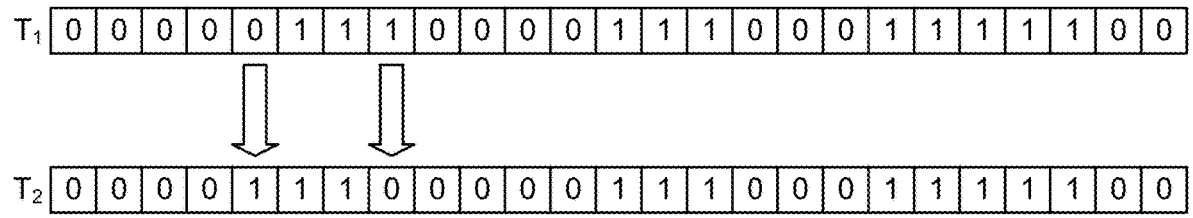
FIG. 12 is a block diagram illustrating a pixel-by-pixel comparison of an example slice of an address bar at two times $T_1$ and $T_2$, in which only minor changes are detected in the slice of the address bar indicating that no changes to the URL have occurred, according to some embodiments.

FIG. 12 is a block diagram illustrating a pixel-by-pixel comparison of an example slice of an address bar at two times $T_1$ and $T_2$, in which only minor changes are detected in the slice of the address bar indicating that no changes to the URL have occurred, according to some embodiments. In the example shown in FIG. 12, a few minor changes occur to the slice determined between subsequent frames at Time=$T_1$ and at the Time=$T_2$. However, the changes are not significant, and are not indicative of a likely change to the URL contained in the address bar 175. For example, the character recognition process 165 is using data about the address bar 175 captured by the browser native screenshare client 170. The screenshare data captured by the browser native screenshare client 170 can vary somewhat over time, which can result in minor differences perceived by the a linear pixel check algorithm in the character recognition process 165. By comparing the determined changes with a threshold D, the character recognition process is able to accommodate minor variations without re-running the character recognition process on the full characters of the address bar.

Instead of performing a pixel-by-pixel comparison, in some embodiments one or more average pixel values of the slice may be determined at the previous frame at Time=$T_1$, and changes to the one or more average pixel values over time may be determined. Example average pixel values might include average red, green, and blue values of the pixels of the slice. If the average pixel value changes by more than a threshold D, a determination may be made that it is possible that the URL of the address bar 175 has changed. An example threshold D might be, if the average pixel value of the slice changes by more than 2%. If the average pixel values at the current Time=$T_2$ are within 2% of the average pixel values at the previous Time=$T_1$, a determination is made that it is unlikely that the URL has changed. By contrast, if the average pixel value of the slice at the current Time=$T_2$ is not within 2% of the average pixel value at the previous Time=$T_1$, a determination is made that it is possible that the URL has changed. Although an example threshold D of 2% has been used to illustrate one particular implementation, it should be understood that other thresholds may similarly be used.

In some embodiments, the comparison threshold D may apply to the slice as a whole, or may be applied to portions of the slice. For example, if the linear pixel check algorithm in the character recognition process 165 determines that the average pixel value within a sub-region of the slice have changed, the character recognition process 165 may determine that it is possible that the URL has changed and perform a full character recognition process on the content of the address bar to ensure that the current URL is contained in the list of allowed website URLs 160.

Figure 13:
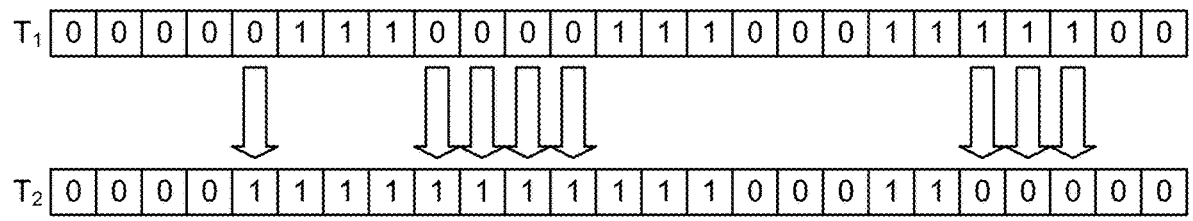
FIG. 13 is a block diagram illustrating a pixel-by-pixel comparison of an example slice of an address bar at two times $T_1$ and $T_2$, in which significant changes are detected in the slice of the address bar indicating a possible change to the URL might have occurred, according to some embodiments.

FIG. 13 is a block diagram illustrating a pixel-by-pixel comparison of an example slice of an address bar at Time=$T_1$ and the slice of the address bar at the current Time=$T_2$, in which significant changes are detected in the slice indicating a possible change to the URL might have occurred, according to some embodiments. As shown in FIG. 13, in this example there are 8 changes in a section of the slice that includes 26 pixels. In this example, the character recognition process 165 determines that this change to the monitored slice is sufficiently significant to conclude that there might have been a change to the URL shown in the address bar 175. Accordingly, the character recognition process 165 will perform a full character recognition scan on the content of the address bar to ensure that the current URL is contained in the list of allowed website URLs 160.

Figure 14:
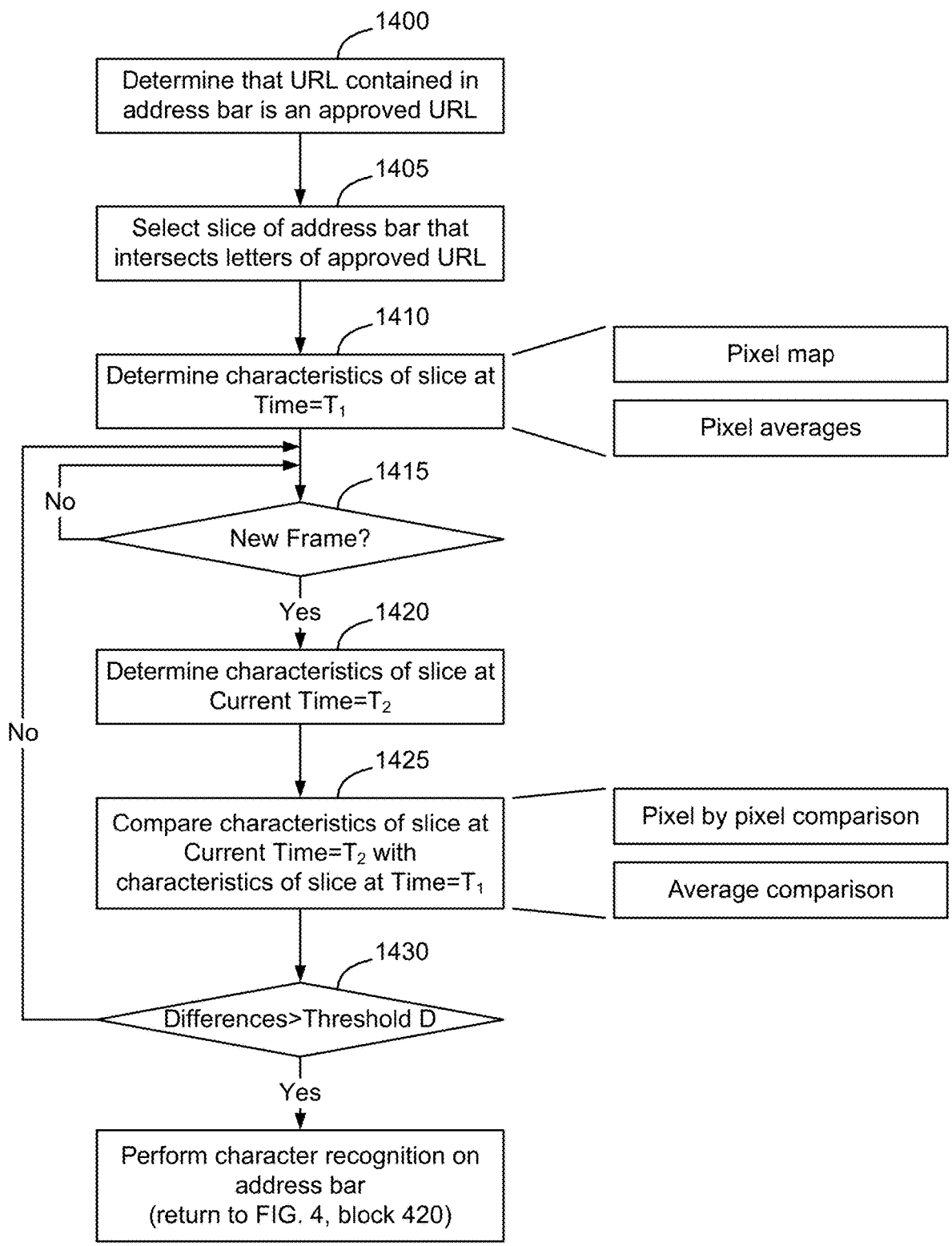
FIG. 14 is a flow chart of an example process of monitoring the content of an address bar using a linear pixel check algorithm, according to some embodiments.

FIG. 14 is a flow chart of an example process of monitoring the content of an address bar using a linear pixel check algorithm, according to some embodiments. As shown in FIG. 14, in some embodiments when the character recognition process determines that the URL contained in the address bar is an approved URL (block 1400), a linear pixel check process selects a slice of the address bar that intersects the letters of the approved URL (block 1405). The slice may be a single row of pixels, a number of adjacent rows of pixels, two or more separate rows of pixels (non-vertically adjacent rows of pixels), or another collection of pixels of the address bar, depending on the implementation. Since the character recognition process knows the location of the characters that form the URL, the character recognition process is able to select one or more rows of pixels that intersect the URL characters.

The linear pixel check process determines the characteristics of the slice of the address bar containing the approved URL (block 1410). The characteristics of the slice of the address bar containing the approved URL will be referred to as the characteristics of the slice at Time=$T_1$. As shown in FIG. 14, there may be multiple ways to characterize the slice at Time=$T_1$. For example, a pixel map may be obtained and subsequently used to perform a pixel-by-pixel comparison to look for changes to the slice that might indicate that the URL has been changed. Alternatively, one or more average values such as average color values might be generated by the linear pixel check process.

After the characteristics of the slice have been determined at Time=$T_1$, the linear pixel check process waits for a new frame (block 1415) and, when a new frame is detected (a determination of YES in block 1415), determines the characteristics of the slice at the current Time=$T_2$ (block 1420). The linear pixel check process then compares the characteristics of the slice at the current Time=$T_2$ with the characteristics of the slice at the initial Time=$T_1$ (block 1425). For example, the linear pixel check process may implement a bit-by-bit comparison between the pixels of the initial slice and the pixels of the current slice. Alternatively, if one or more statistical values such as the pixel average color were used to characterize the pixels of the original slice at Time=$T_1$, the same statistical values can be computed based on the current values of the pixels of the current slice at Time=$T_2$, such that a comparison can be implemented to determine if it is likely that the URL contained in the address bar has changed.

Based on the comparison between the initial characteristics of the slice at Time=$T_1$ and the current characteristics of the slice at Time=$T_2$, the linear pixel check process determines if the characteristic differences are more than a threshold D (block 1430). In a pixel-by-pixel comparison, threshold D may be specified as a percentage of the total number of pixels or an absolute number of pixels. Where the characteristics of the slice are specified using a statistical value such as one or more average pixel colors (e.g., average red, average blue, and average green values), the threshold D may be specified as a percentage change of one or more of the average values.

If the content of the slice does not change more than the threshold D (a determination of NO at block 1430) the linear pixel check process determines that the URL of the address bar has not changed, allows the screenshare task to continue, and continues monitoring the slice by performing a frame-by-frame comparison of the slice of the address bar. If the content of the slice changes more than the threshold D (a determination of YES at block 1430), in some embodiments the process returns to FIG. 4, block 420, where the character recognition process 165 performs a character recognition process on the full characters of the address bar to determine if the URL that is currently contained in the address bar is on the list of approved URLs.

By monitoring a slice of the address bar, and looking for changes to the slice rather that performing a character recognition process on the full letters of the address bar, it is possible to detect changes to the URL contained in the address bar without incurring the computational cost associated with performing a full character recognition process. This enables the frame rate of the screenshare session 185 to be increased, since the character recognition process 165 is able to perform URL monitoring sufficiently quickly such that the character recognition process 165 will not constrain the frame rate used by the browser native screenshare client to implement the screenshare session 185.

Character Recognition Pre-Processing Optimization

Figure 15:
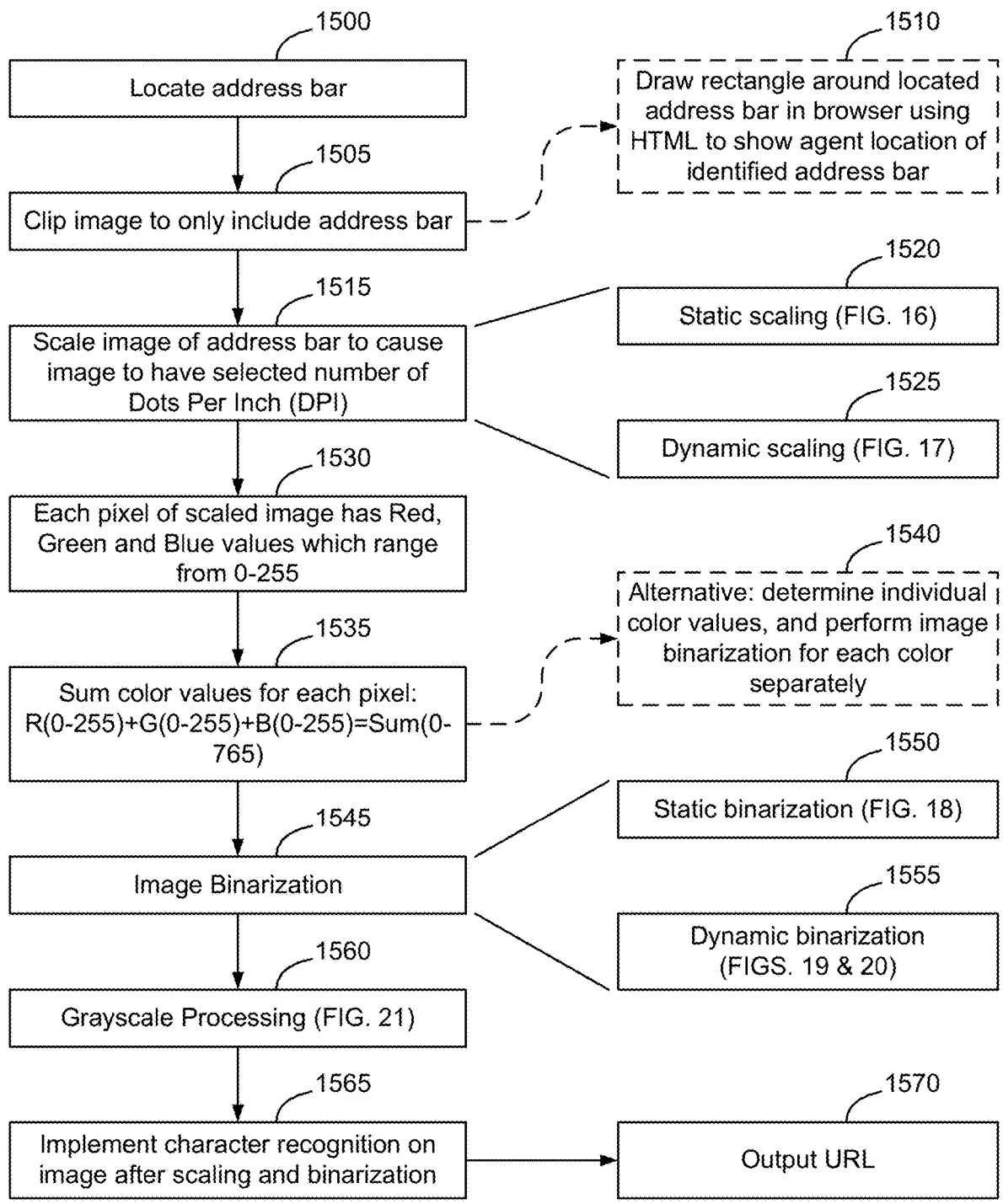
FIG. 15 is a flow chart of an example process of performing character recognition on a portion of an image, such as an address bar, according to some embodiments.

FIG. 15 is a flow chart of an example process of performing character recognition on a portion of an image, such as an address bar, according to some embodiments. In some embodiments, performing character recognition on a color image may be difficult to implement accurately. Similarly, if the image has very small characters, or very large characters, it may be difficult to recognize the characters in the image, because the characters are of a size/shape that are not expected by the character recognition process 165. Accordingly, in some embodiments, once the address bar has been identified, the image of the address bar is pre-processed using scaling and/or binarization processing, and optionally grayscale processing, as shown in FIG. 15. Additional details of particular aspects of FIG. 15 are described in greater detail in connection with FIGS. 16-21. By optimizing the image of the address bar, it is possible to make the characters contained in the image more readily recognizable by the character recognition process 165. Although FIGS. 15-21 is described in the context where the address bar has been located (FIG. 4, block 425), it should be understood that the techniques described in connection with FIGS. 15-21 can also be used to perform image pre-processing in instances where the location of the address bar is not able to be determined (FIG. 4, block 415) depending on the implementation.

As shown in FIG. 15, once the address bar has been located (block 1500), an image of the address bar is obtained from the image of the web browser captured by the screenshare software and the image is clipped to only include the address bar (block 1505). Optionally, the location of the address bar may be shown to the agent on the browser window that the agent is attempting to screenshare (block 1510), for example by adding a HTML element to the browser DOM in the shape of a rectangle, that is drawn around the coordinates identified by the character recognition process 165 as encompassing the address bar. Block 1510 is shown in dashed lines to indicate that block 1510 is optional, depending on the implementation. For example, a red or green address bar rectangle can be drawn by the character recognition process around the identified address bar and shown to the agent on the browser window. Optionally, the agent may interact with the address bar rectangle in the browser, for example by moving the address bar to reposition the address bar, or by resizing the address bar to move one or more of the dimensions of the address bar, depending on the implementation. In embodiments where the agent is able to interact with the address bar, the interaction may be used as feedback to adjust the size and location of the address bar that is used when clipping the image from the screenshare session in block 1505.

The clipped image including the address bar is scaled to cause the address bar to have a selected number of dots per inch (block 1515). There are several ways to scale the address bar, including static scaling (block 1520) that is described in greater detail in connection with FIG. 16, and dynamic scaling (block 1525) that is described in greater detail in connection with FIG. 17. By scaling the image to have a particular pixel height, it is possible to cause the characters that are presented to the character recognition process have a size that is within an expected size range.

Each pixel of the scaled image has a plurality of color values. In some embodiments, the pixel color values are red (R), Green (G), and Blue (B). In some embodiments, the color values may vary from 0-255 (block 5130), although the particular range of values may depend on the particular screenshare capture process that is being used to capture the image of the webpage 130 being shown in browser 145. For example, one screenshare process may be configured to specify colors using 256 (0-255) color values, whereas a different screenshare process may have a different color resolution such as by being able to specify 500 color values (values 0-499). Accordingly, the particular color ranges that are able to be specified may depend on the particular implementation of the screenshare client.

Further, a given webpage 130 may display differently on different computers and monitors. For example, different monitors may have different colorization characteristics. Accordingly, it has been found that a first monitor connected to a first type of processor may display different color hues for a given website, than a second monitor connected to the same type of processor or a different type of processor would display, when showing the same website.

According to some embodiments, a binarization process is implemented on the image of the address bar (block 1545) to convert the color image of the address bar into a black and white image. Binarization is also referred to herein as black and white pixel thresholding. There are several ways to implement a binarization process on the image of the address bar, including static binarization process (block 1550) that is described in greater detail in connection with FIG. 18, and dynamic binarization process (block 1555). Several example dynamic binarization processes are described in greater detail in connection with FIGS. 19 and 20.

As shown in FIG. 15, in some embodiments the color values are summed (block 1535) and image binarization process is implemented on the sum of the color values of the pixels. Specifically, a color sum is calculated for each pixel, in which the sum for a given pixel is calculated from the sum of the pixel's red value plus the pixel's green value plus the pixel's blue value. In embodiments where the color range of the pixels is between 0 and 255, the sum will have a value of between 0 and 765: Pixel_Sum=Pixel_Red_Value+Pixel_Green_Value+Pixel_Blue_Value.

As shown in FIG. 15, it is possible to alternatively not sum the red, green, and blue values for a given pixel, and instead perform binarization directly on each of the individual color values (block 1540). Optionally, both binarization processes may be used, depending on the implementation.

The preprocessing techniques, including scaling and binarization, enhance the probability that the character recognition process 15 will recognize all of the characters of the address bar correctly. The level of binarization, the number of binarization layers, and the amount the image is scaled to provide an optimal character recognition using methods such as Optical Character Recognition (OCR) are dependent on the resolution and brightness of a monitor, as well as other potential factors. As noted above, it is possible to use both static and dynamic scaling, as well as static and dynamic binarization. The dynamic methods can adjust the binarization thresholds and scaling of the image until the agent's machine is optimized for character and URL recognition. Once the binarization thresholds and scaling have been determined for a particular agent, those optimization values are stored for use in connection with subsequent character recognition operations on the agent computer. Since each agent will have a different monitor, with different characteristics, and each agent may set the brightness value of the monitor differently according to personal preference, the optimization values would be expected to be different for different agents and, accordingly, in some embodiments the dynamic scaling and dynamic binarization parameters are learned for each agent and used to customize the character recognition process for each specific agent.

In some embodiments, after binarization, grayscale processing is implemented on the resulting image of the address bar (block 1560). Grayscale processing, as that term is used herein, refers to enabling the pixels surrounding an image to be adjusted to a grayscale. This results in the characters not becoming pixelated, and improves the recognition of the characters when using particular character recognition processes such as Optical Character Recognition.

Once the pre-processing such as scaling, binarization, and optionally grayscale processing has been implemented on the address bar, character recognition is implemented on the image (block 1565). The characters of the URL determined by the character processing process 165 are then output (block 1570) and the process returns to FIG. 4, block 425, where a determination is made as to whether the characters match one of the URLs in the approved list of URLs.

Figure 16:
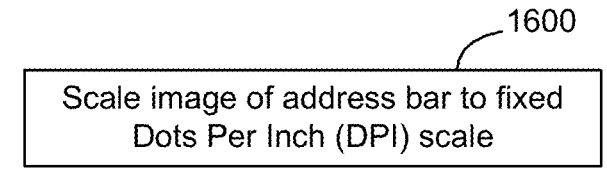
FIG. 16 is a flow chart of an example static scaling process that may be used in connection with the process of performing character recognition shown in FIG. 15, according to some embodiments.

FIG. 16 is a flow chart of an example static scaling process that may be used in connection with the process of performing character recognition shown in FIG. 15, according to some embodiments. As shown in FIG. 16, in a static scaling process, the image of the address bar is scaled to have a fixed resolution, such as a fixed number of dots per inch (block 1600). The size of the image may be adjusted upwards or downwards to cause the size of the image to be scaled such that the image has the correct number of dots per inch. Different agents may have settings applied to their computers to cause the way that windows appear on their monitor personalized. For example, in Windows™ it is possible to change the display settings to scale the layout, which will change the size of the header of the browser window and, hence, will change the size of the address bar. When the image of the address bar is captured, the address bar can be scaled using a static scaling process to cause the image of the address bar to contain a preferred number of dots per inch. For example, if an agent has the layout settings set to show a very small address bar, the image of the address bar that is captured can be enlarged using a scaling process to ensure that the image that is processed by the character recognition process has sufficient detail to enable the character recognition process to identify characters within the address bar. Scaling can include horizontal scaling as well as vertical scaling and, optionally, is implemented to maintain an aspect ratio of the original image constant. When a static scaling process is used (block 1600) the static scaling value may be experimentally determined to be a value that works well in most instances.

Figure 17:
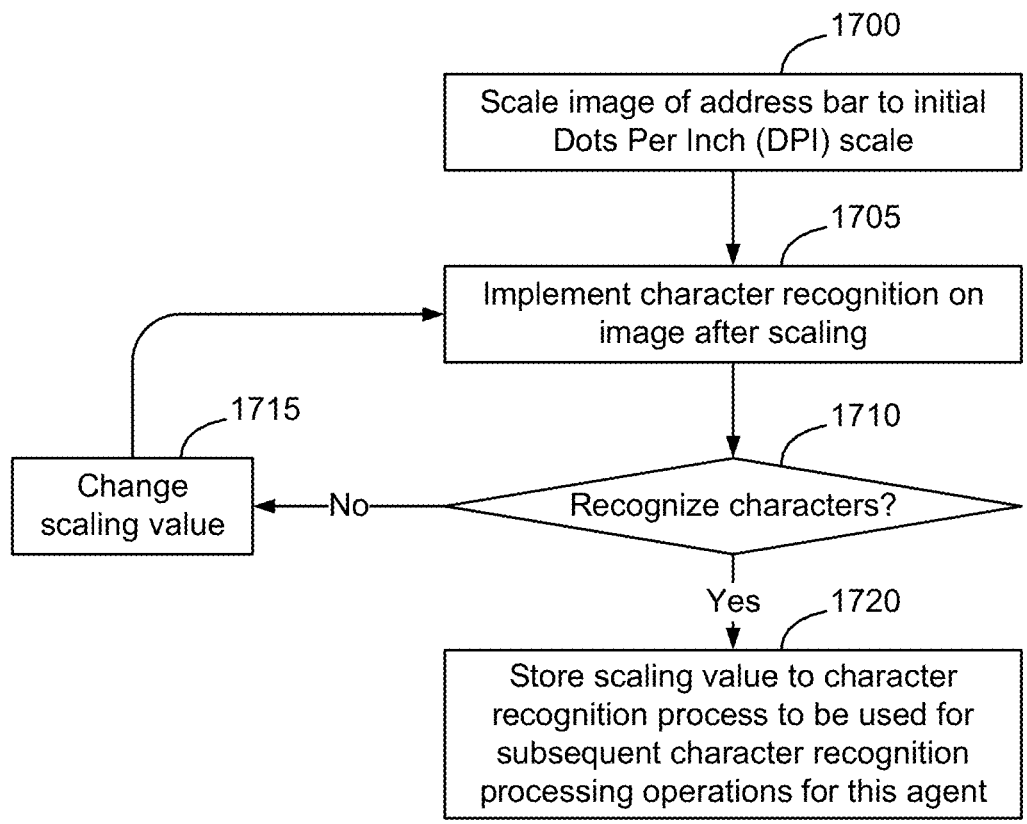
FIG. 17 is a flow chart of an example dynamic scaling process that may be used in connection with the process of performing character recognition shown in FIG. 15, according to some embodiments.

FIG. 17 is a flow chart of an example dynamic scaling process that may be used in connection with the process of performing character recognition shown in FIG. 15, according to some embodiments. As shown in FIG. 17, in some embodiments dynamic scaling is used to dynamically determine a scaling factor to be applied to the image of the address bar. In some embodiments, the dynamic scaling process scales the image of the address bar to an initial scaling value measured in dots per inch (block 1700). Character recognition is then implemented on the image (block 1705) to determine if it is possible to recognize the characters (a determination of YES at block 1710). In response to a determination that it is not possible to recognize the characters (a determination of NO at block 1710), the scaling value is changed (block 1715), and character recognition is implemented on the newly scaled image (block 1705). The process of blocks 1705, 1710, and 1715 iterates until an acceptable scaling value is determined, which is the scaling ratio applied to the original image that results in recognizable characters (a determination of YES at block 1710). In response to a determination that the characters are recognizable, the scaling value is stored to the character recognition process to be used for subsequent character recognition processing operations for this agent (block 1720).

Figure 18:
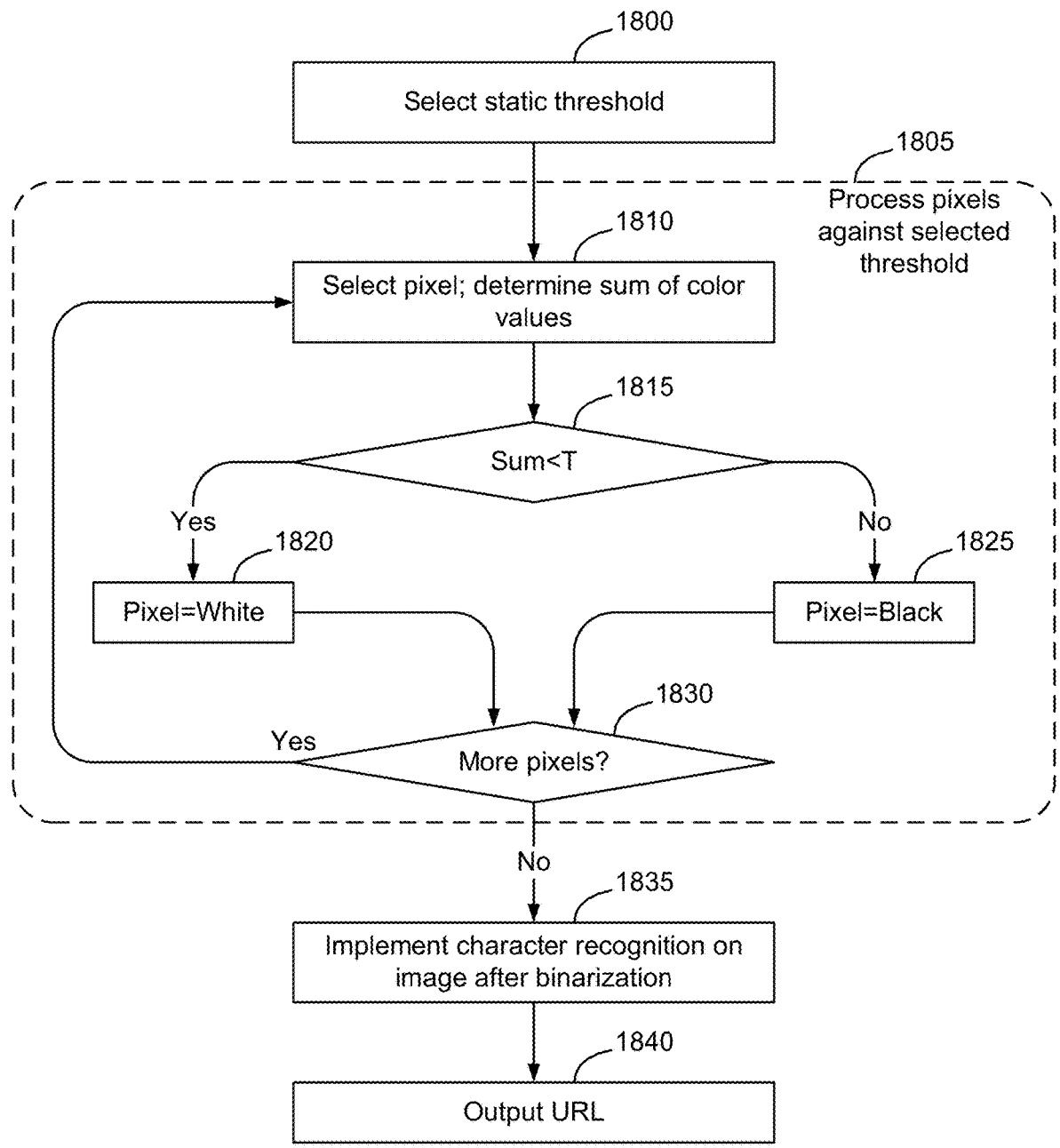
FIG. 18 is a flow chart of an example static binarization process that may be used in connection with the process of performing character recognition shown in FIG. 15, according to some embodiments.

FIG. 18 is a flow chart of an example static binarization process that may be used in connection with the process of performing character recognition shown in FIG. 15, according to some embodiments. As shown in FIG. 15, when static binarization is to be implemented in connection with recognizing the characters contained in the address bar, a static threshold is selected (block 1800). The static threshold may be experimentally determined to be a threshold that is sufficient to determine characters in many scenarios. In embodiments where the color values (red, green, and blue values) are summed, a single threshold is selected in block 1800 to be applied. In instances where individual thresholds are applied against each color separately, the thresholds selected in block 1800 are color specific. For ease of explanation, some embodiments are described in connection with FIG. 18 in which the values of the colors re summed and the threshold selected in block 1800 is a threshold that is applied against the sum of the color values. In embodiments where the values of the colors range from 0-255 and the values of the colors are summed, a threshold value of between 300-400 might be selected as a threshold value, although other thresholds may be selected as well depending on the embodiment. In situations where a group of agents are provided with similar computers and monitor systems, the particular threshold may be based on experimentation using the computer and monitor systems used by the agents by obtaining images of address bars displayed on several of the agent displays, and selecting a static threshold value determined to be adequate to implement binarization of the images of the address bars obtained from the select group of agents.

As shown in FIG. 18, once the threshold has been selected (block 1800), the pixels of the image of the address bar are processed against the selected threshold (block 1805). In some embodiments, processing pixels against the selected threshold (block 1805) includes, for each pixel, determining the sum of the color values of the pixel (block 1810) and comparing the determined sum of the color values against the static threshold (block 1815). In response to a determination that the sum of the pixel color values is less than the threshold (a determination of YES at block 1815) the determined color of the pixel is white (block 1820). In response to a determination that the sum of the pixel color values is equal to or greater than the threshold (a determination of NO at block 1815) the determined color of the pixel is black (block 1825).

After processing a particular pixel, a determination is made as to whether the image of the address bar contains additional pixels to be processed (block 1830). In response to a determination that there are more pixels to be processed (a determination of YES at block 1830), a subsequent pixel is selected and processed against the threshold. In response to a determination that there are no more pixels to be processed (a determination of NO at block 1830), binarization of the image bar is complete, and character recognition is implemented on the binarized image of the address bar (block 1835). The characters identified in the binarized image are output as the URL (block 1840). Although FIG. 18 describes some embodiments in which the pixels are processed against the threshold (block 1805) serially, it should be understood that it is also possible to process the pixels in parallel, depending on the implementation.

Figure 19:
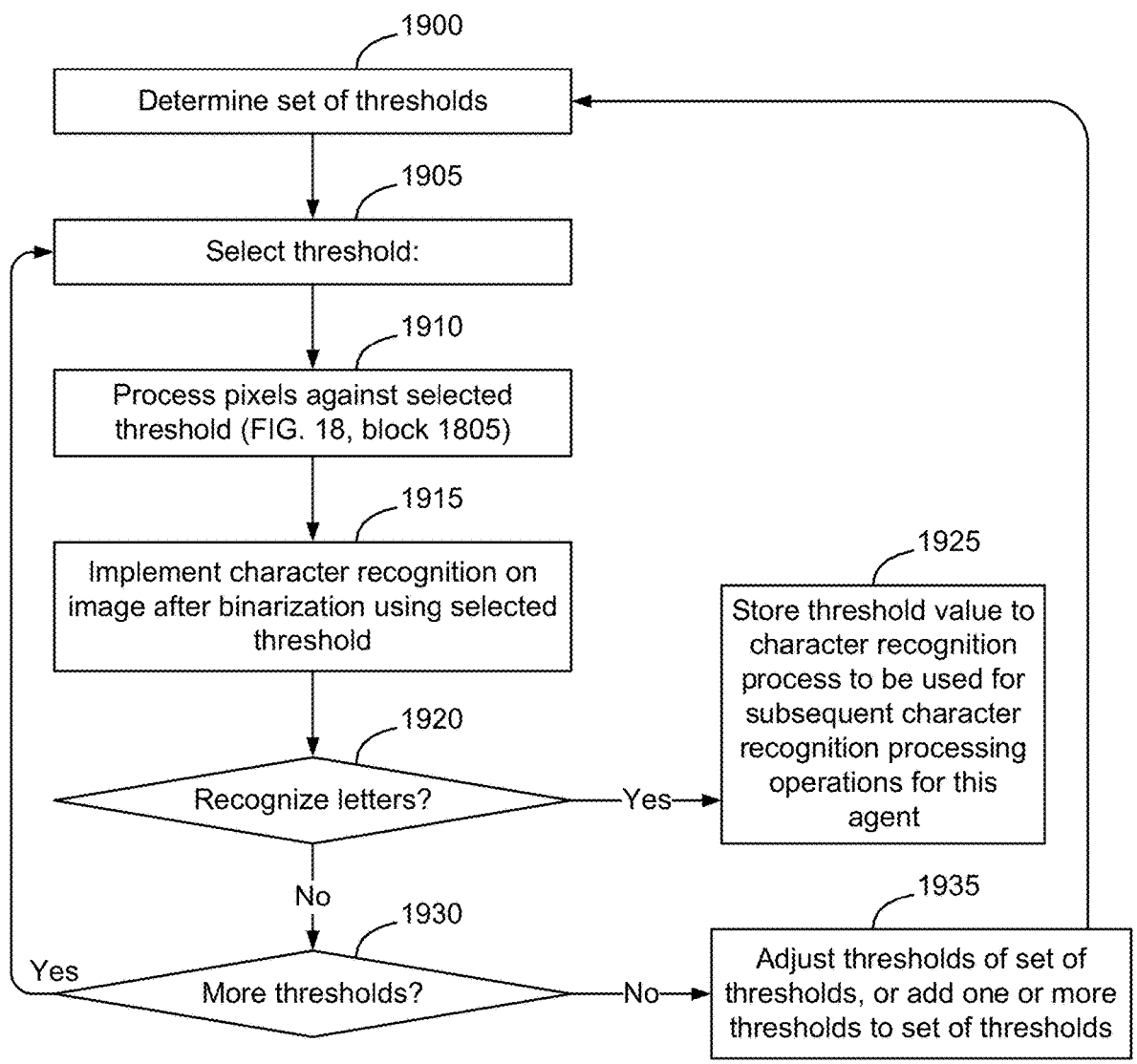
FIG. 19 is a flow chart of an example dynamic binarization process that may be used in connection with the process of performing character recognition shown in FIG. 15, according to some embodiments.

FIG. 19 is a flow chart of an example dynamic binarization process that may be used in connection with the process of performing character recognition shown in FIG. 15, according to some embodiments. As shown in FIG. 19, in some embodiments the dynamic binarization process includes determining an initial set of thresholds (block 1900). In embodiments where the values of the colors range from 0-255 and the values of the colors are summed, an initial set of threshold value might be 300, 350, and 400, although the particular set of initial thresholds may vary depending on the particular implementation.

After selecting an initial set of thresholds, one threshold of the set of thresholds is selected (block 1905) and pixels of the image of the address bar are processed against the threshold (block 1910). In some embodiments, processing pixels against the selected threshold is implemented as shown in FIG. 18, block 1805.

After binarization using the selected threshold, character recognition is implemented on the image of the address bar (block 1915) and a determination is made as to whether it is possible to recognize letters within the address bar (block 1920). In some embodiments, the process of determining whether it is possible to recognize letters within the address bar is implemented by determining whether all letters are recognizable, or whether some groups of pixels that appear likely to be characters are not recognizable as actual characters. The particular method of determining whether the characters are recognizable will depend on the particular embodiment.

In response to a determination that it is possible to recognize all of the letters in the image of the address bar (a determination of YES at block 1920), the threshold value is stored to the character recognition process to be used for subsequent character recognition processing operations for this agent (block 1925).

In response to a determination that it is not possible to recognize all of the letters in the image of the address bar (a determination of NO at block 1920), a determinations is made as to whether there are additional thresholds in the initial set of thresholds (block 1930). If there are additional thresholds in the initial set of thresholds (a determination of YES at block 1930), another threshold in the initial set of thresholds is selected and the process shown in blocks 1910,

1915, 1920, and 1925 iterates until a threshold is selected in block 1920, or until all thresholds of the initial set of thresholds have been applied against the pixels of the address bar (a determination of NO a block 1930).

If all of the thresholds of the initial set of thresholds have be used in binarization processes, and none of the thresholds have been determined to provide a sufficient level of binarization that will enable the character recognition process to recognize the letters of the address bar, in some embodiments the thresholds of the initial set of thresholds are adjusted or one or more additional thresholds are added to the initial set of thresholds (block 1935). The process then returns to consider the adjusted set of thresholds or the expanded set of thresholds. For example, in embodiments where the dynamic binarization process is configured to adjust the values of the initial set of thresholds, and the initial set of thresholds were 300, 350, and 400, the initial set of thresholds may be adjusted to include thresholds 450, 500, and 550. In embodiments where the dynamic binarization process is configured to add threshold values to the initial set of thresholds, and the initial set of thresholds were 300, 350, and 400, the initial set of thresholds may be supplemented to include thresholds 300, 350, 400, 450, 500, and 550. The thresholds may be incrementally adjusted or supplemented in block 1935, and the particular manner in which the initial set of thresholds is adjusted or supplemented will depend on the particular implementation.

Figure 20:
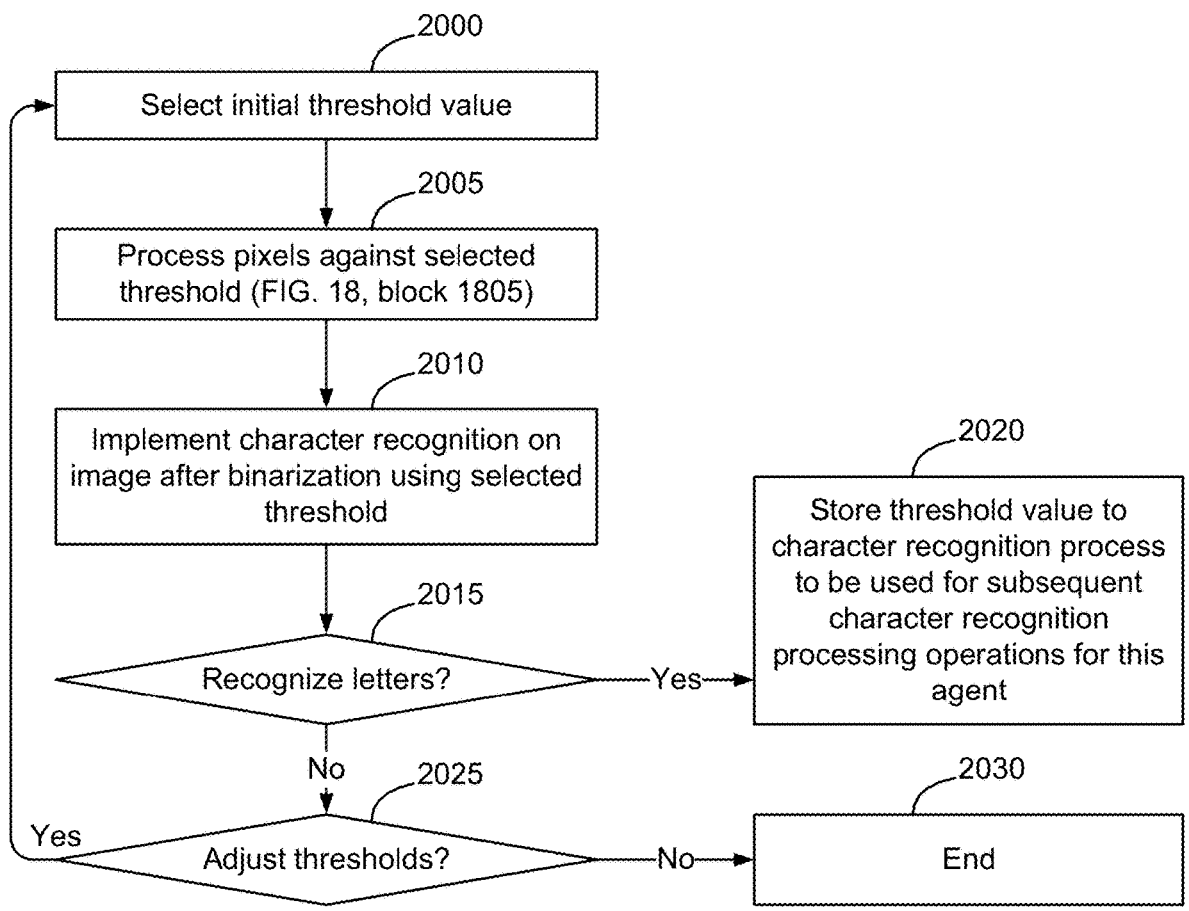
FIG. 20 is a flow chart of another example dynamic binarization process that may be used in connection with the process of performing character recognition shown in FIG. 15, according to some embodiments.

FIG. 20 is a flow chart of another example dynamic binarization process that may be used in connection with the process of performing character recognition shown in FIG. 15, according to some embodiments. As shown in FIG. 20, in some embodiments an initial threshold value is selected (block 2000), and pixels of the image of the address bar are processed against the selected threshold value (block 2005). Character recognition is then implemented on the binarized image (block 2010) and a determination is made as to whether the characters are recognizable (block 2015). In response to a determination that it is possible to recognize all of the letters in the image of the address bar (a determination of YES at block 2015), the threshold value is stored to the character recognition process to be used for subsequent character recognition processing operations for this agent (block 2020).

In response to a determination that it is not possible to recognize all of the letters in the image of the address bar (a determination of NO at block 2015), a determination is made as to whether to adjust the threshold (block 2025). In response to a determination to not adjust the threshold, the process ends (block 2030). In response to a determination to adjust the threshold (a determination of YES at block 2025), the initial threshold is adjusted and the binarization process iterates using different adjusted thresholds until characters are recognizable in the binarized image of the address bar (a determination of YES at block 2015).

FIG. 21 is a flow chart of example grayscale processing that may be used in connection with the process of performing character recognition shown in FIG. 15, according to some embodiments. As discussed above in connection with FIGS. 19 and 20, binarization results in a determination for each pixel as to whether the pixel is black (above a threshold color value) or white (below a threshold color value). Binarization can cause the image of the address bar to become pixelated, which can make it more difficult for the character recognition process to accurately recognize the characters in the binarized image of the address bar.

As shown in FIG. 21, in some embodiments once the image has been binarized, a grayscale process is applied to the binarized image to add gray pixels to the image in regions adjacent the determined black pixels. By causing the pixels adjacent the black pixels to be colored a shade of gray, rather than being white, it is possible to smooth the binarized image to make it easier for the character recognition process to identify characters within the image of the address bar.

As shown in FIG. 21, in some embodiments the image of the address bar is obtained after scaling and binarization (block 2100). The pixels of the image are then processed to replace some of the white pixels that are adjacent to the black pixels with gray pixels. For example, as shown in FIG. 21, in some embodiments the grayscale process selects a black pixel (block 2105) and determines if any pixel adjacent to the black pixel is white (block 2110). A pixel may be considered "adjacent" if it is horizontally, vertically, or diagonally adjacent to the selected black pixel. If any adjacent pixel is white (a determination of YES at block 2110), the pixel color is set to be gray (block 2115). If any adjacent pixel is not white (a determination of NO at block 2110), the pixel was determined to be a black pixel during the binarization process and no change is made to the color of the pixel (block 2120).

A determination is then made if there are any additional black pixels (block 2125). If there are additional black pixels (a determination of YES at block 2125) the process shown in blocks 2105, 2110, 2115, and 2120 iterates until all black pixels have been processed. If there are no additional black pixels (a determination of NO at block 2125), grayscale processing is complete and the character recognition process is used to determine the characters of the image of the address bar (block 2130).

Although FIG. 21 shows the grayscale process being serially applied to pixels for ease of explanation, it should be understood that grayscale processing can be implemented on multiple or all of the pixels simultaneously depending on the implementation. Likewise, although FIG. 21 shows the grayscale process being used to select black pixels and then change the color of adjacent white pixels to gray, in some embodiments the grayscale processing can be implemented by selecting a white pixel, determining whether the selected white pixel is adjacent a black pixel, and if the selected white pixel is adjacent a black pixel, setting the color of the selected white pixel to gray.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of restricting screenshare of web pages to select list of allowed website Uniform Resource Locators (URLs), comprising the steps of:
    establishing a co-browse session between a first participant and a second participant in which a Document Object Model (DOM) of a first browser at the first participant is transmitted to the second participant and used at the second participant to recreate a content of the first browser at a second browser;
    starting a screenshare task at the second participant, the screenshare task being configured to capture an image of a display of a third browser at the second participant and transmit the captured image of the display of the third browser to the first participant on a screenshare session to cause a view of the third browser to be displayed in a window at the first participant;
    determining an address bar location of the third browser from the captured image of the display of the third browser;
    using a character recognition process to identify a URL contained in a portion of the image corresponding to an address bar of the third browser;
    comparing the identified URL with a list of approved URLs to determine if the identified URL is included in the list of approved URLs;
    in response to a determination that the identified URL is included in the list of approved URLs, enabling the screenshare task at the first participant and at the second participant to enable the captured display of the third browser to be displayed in the window at the first participant on the screenshare session; and
    in response to a determination that the identified URL is not included in the list of approved URLs, preventing the screenshare task at the first participant or at the second participant to prevent the captured display of the third browser from being displayed in the window at the first participant on the screenshare session.

2. The method of claim 1, wherein determining the address bar location of the third browser from the captured display of the third browser comprises:
    selecting a column horizontally offset from a left edge of the captured display of the third browser;
    scanning vertically down the selected column to identify color values of pixels of the selected column; and
    identifying a first color change between pixels of the selected column as a top of the address bar of the third browser.

3. The method of claim 2, further comprising identifying a second color change between pixels of the selected column as a bottom of the address bar of the third browser.

4. The method of claim 1, wherein determining the address bar location is implemented by a character recognition process in the third browser.

5. The method of claim 4, wherein the character recognition process is an optical character recognition process.

6. The method of claim 4, wherein using character recognition process to identify the URL contained in the address bar of the third browser is implemented by transmitting an image of the address bar or an image of a portion of the captured display of the third browser to an external character recognition process.

7. The method of claim 6, wherein the external character recognition process is configured to receive the transmitted image, implement optical character recognition on the received image, and return as a response any characters identified in the received image.

8. The method of claim 1, in response to the determination that the identified URL is included in the list of approved URLs, the method further including monitoring the identified URL to identify any changes to the identified URL; and in response to identifying a change to the URL repeating the process of using the character recognition process to identify the URL contained in the address bar of the third browser.

9. The method of claim 8, wherein monitoring comprises implementing a linear pixel check on the address bar of the third browser.

10. The method of claim 9, wherein the linear pixel check comprises monitoring the content of a slice of the address bar.

11. The method of claim 10, wherein monitoring the content of a slice of the address bar comprises identifying a first row of pixels horizontally intersecting the characters of contained within the address bar;
   determining optical characteristics of the first row of pixels to create a baseline set of optical characteristics of the first row of pixels;
   periodically scanning the first row of pixels to determine current optical characteristics of the first row of pixels; and
   comparing the current optical characteristics of the first row of pixels with the baseline set of optical characteristics of the first row of pixels to determine if the current optical characteristics of the first row of pixels is different than the baseline set of optical characteristics of the first row of pixels.

12. The method of claim 11, wherein the determined optical characteristics comprise color values of the pixels; and
   wherein determining if the current optical characteristics of the first row of pixels is different than the baseline set of optical characteristics of the first row of pixels comprises determining if an average of the color values of the current optical characteristics is different than an average of the color values of the baseline optical characteristics.

13. The method of claim 11, wherein the determined optical characteristics comprise color or luminance values of each of the pixels; and
   wherein determining if the current optical characteristics of the first row of pixels is different than the baseline set of optical characteristics of the first row of pixels comprises performing a pixel-by-pixel comparison to determine if the color or luminance value of individual pixels of the current optical characteristics are different than corresponding individual pixels of the baseline optical characteristics.

14. The method of claim 1, wherein, in response to a determination that the identified URL is not included in the list of approved URLs, the method further comprising:
   determining a first URL in the list of approved URLs that is most similar to the identified URL;
   identifying a set of mismatched characters in the identified URL that are different from characters of the first URL;
   determining locations of the set of mismatched characters in the identified URL that are different from characters of the first URL;
   locally expanding a size of the address bar in the determined locations of the mismatched characters to create an expanded address bar;
   using the character recognition process to identify a second URL contained in the expanded address bar of the third browser; and
   comparing the identified second URL with the list of approved URLs to determine if the identified second URL is included in the list of approved URLs.

15. The method of claim 14, wherein using the character recognition process to identify the second URL comprises implementing the character recognition process only on the set of mismatched characters.

16. The method of claim 1, wherein establishing the co-browse session comprises creating a first entry in a Customer Relationship Management (CRM) record identifying the co-browse session; and
   wherein establishing the screenshare session comprises creating a second entry int the CRM record.

17. The method of claim 16, wherein the second entry contains the URL of the third browser.

18. The method of claim 16, wherein the second entry contains an indication as to whether the URL of the third browser was included in the list of approved URLs or was not included in the list of approved URLs.

19. The method of claim 1, wherein starting the screenshare task comprises pausing the screenshare task to not capture the display of the third browser and not transmit the captured display of the third browser until after comparing the identified URL with the list of approved URLs, determining that the identified URL is included in the list of approved URLs, and enabling the screenshare task.

20. The method of claim 1, wherein starting the screenshare task comprises capturing the display of the third browser, transmitting the captured display of the third browser to the first participant, and disabling display of the captured display at the first participant, prior to completion of comparing the identified URL with the list of approved URLs; and
   wherein enabling the screenshare task at the first participant comprises enabling display of the captured display at the first participant.

21. The method of claim 1, further comprising creating an image of the address bar by cropping the captured image of the display of the third browser based on the determined address bar location, and pre-processing the image of the address bar prior to using the character recognition process to identify the URL contained the image of the address bar.

22. The method of claim 21, wherein pre-processing comprises scaling the image of the address bar using a static scaling process or a dynamic scaling process.

23. The method of claim 22, wherein the static scaling process comprises scaling the image of the address bar to cause the image of the address bar to have a predefined resolution.

24. The method of claim 22, wherein the dynamic scaling process comprises iteratively scaling the image of the address bar to different resolutions and performing character recognition on the iteratively scaled image until a resolution is identified that enables the character recognition process to identify characters within the image of the address bar.

25. The method of claim 21, wherein pre-processing comprises binarizing the image of the address bar using a static binarization process or a dynamic binarization process.

26. The method of claim 25, wherein the static binarization process comprises binarizing the image of the address bar using a predefined threshold to cause pixels of the address bar to have either a black or a white value depending in dependence on the predefined threshold.

27. The method of claim 25, wherein the dynamic binarization process comprises iteratively selecting a binarization threshold, binarizing the image of the address bar using the selected binarization threshold to cause the pixels of the address bar to have either a black or a white value depending in dependence on the selected threshold, and performing character recognition on the iteratively binarized image until a binarization threshold is identified that enables the character recognition process to identify characters within the image of the address bar.

28. The method of claim 25, further comprising applying a grayscale process to the binarized image to change white pixels that are adjacent to black pixels to have a gray color.

* * * * *